United States Patent
Shibayama

(10) Patent No.: US 9,727,531 B2
(45) Date of Patent: Aug. 8, 2017

(54) FAST FOURIER TRANSFORM CIRCUIT, FAST FOURIER TRANSFORM PROCESSING METHOD, AND PROGRAM RECORDING MEDIUM

(71) Applicant: NEC Corporation, Minato-ku, Tokyo (JP)

(72) Inventor: Atsufum Shibayama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 153 days.

(21) Appl. No.: 14/646,587

(22) PCT Filed: Nov. 19, 2013

(86) PCT No.: PCT/JP2013/006787
§ 371 (c)(1),
(2) Date: May 21, 2015

(87) PCT Pub. No.: WO2014/080617
PCT Pub. Date: May 30, 2014

(65) Prior Publication Data
US 2015/0301986 A1    Oct. 22, 2015

(30) Foreign Application Priority Data
Nov. 26, 2012 (JP) ................. 2012-257728

(51) Int. Cl.
*G06F 17/14* (2006.01)

(52) U.S. Cl.
CPC .................. *G06F 17/142* (2013.01)

(58) Field of Classification Search
None
See application file for complete search history.

(56) References Cited

U.S. PATENT DOCUMENTS

| | | | | |
|---|---|---|---|---|
| 5,477,478 A | * | 12/1995 | Okamoto | G06F 17/147 708/402 |
| 8,001,171 B1 | * | 8/2011 | Simkins | G06F 17/142 708/404 |
| 2006/0010188 A1 | * | 1/2006 | Solomon | G06F 17/142 708/400 |
| 2014/0337401 A1 | * | 11/2014 | Xie | G06F 17/142 708/404 |

(Continued)

FOREIGN PATENT DOCUMENTS

JP    2012-89053 A    5/2012

OTHER PUBLICATIONS

International Search Report for PCT Application No. PCT/JP2013/006787, mailed on Dec. 17, 2013.

(Continued)

*Primary Examiner* — David H Malzahn

(57) ABSTRACT

Provided is a fast Fourier transform circuit including: a first butterfly circuit and a second butterfly circuit which perform butterfly calculations corresponding to calculation bit-widths being different from each other; and a control means which controls selection of the first and second butterfly circuits in accordance with any one of a plurality of operation modes including: a first operation mode in which a calculation is performed by both of the first and second butterfly circuits; and a second operation mode in which a calculation is performed by any one of the first and second butterfly circuits.

9 Claims, 13 Drawing Sheets

(56) References Cited

U.S. PATENT DOCUMENTS

2015/0301986 A1* 10/2015 Shibayama ........... G06F 17/142
708/404

OTHER PUBLICATIONS

J. W. Cooley, J. W. Tukey, "An Algorithm for the Machine Calculation of Complex Fourier Series," Mathematics of Computation, vol. 19, No. 90 (1965), pp. 297-301.
D. P. Kolba, "A Prime Factor FFT Algorithm Using High-Speed Convolution," IEEE Trans. on Acoustics, Speech and Signal Processing, vol. 29, No. 4 (1981).
Masayuki Tokunaga et al., "An examination on the method of Energy reduction with bit width control in FFT circuits for digital wireless communications", IEICE Technical Report, Aug. 11, 2005 (Aug. 11, 2005), vol. 105, No. 234, pp. 7 to 12. English Abstract.
Hideaki Kimura et al., "Energy Reduction Technique of the Digital Signal Processor by Controlling Precision for OFDM-PON" cited as "Densoro Tokusei ni ojita Enzan Seido Seigyo ni yoru OFDM-PON Digital Shingo Shoribu no Sho Denryokuka Hoshiki no Kento", in ISR, Proceedings of the 2012 IEICE General Conference Tsushin 2, Mar. 20, 2012 (Mar. 20, 2012), p. 301.
English Translation of written opinion for PCT Application No. PCT/JP2013/006787.

* cited by examiner

Fig. 9
Related Art

SEQUENTIAL ORDER TABLE 80

CYCLE →

|   | A | B | C | D | E | F | G | H |
|---|---|---|---|---|---|---|---|---|
| 1 | 0 | 1 | 2 | 3 | 4 | 5 | 6 | 7 |
| 2 | 8 | 9 | 10 | 11 | 12 | 13 | 14 | 15 |
| 3 | 16 | 17 | 18 | 19 | 20 | 21 | 22 | 23 |
| 4 | 24 | 25 | 26 | 27 | 28 | 29 | 30 | 31 |
| 5 | 32 | 33 | 34 | 35 | 36 | 37 | 38 | 39 |
| 6 | 40 | 41 | 42 | 43 | 44 | 45 | 46 | 47 |
| 7 | 48 | 49 | 50 | 51 | 52 | 53 | 54 | 55 |
| 8 | 56 | 57 | 58 | 59 | 60 | 61 | 62 | 63 |

FAST FOURIER TRANSFORM CIRCUIT, FAST FOURIER TRANSFORM PROCESSING METHOD, AND PROGRAM RECORDING MEDIUM

This application is a National Stage Entry of PCT/JP2013/006787 filed on Nov. 19, 2013, which claims priority from Japanese Patent Application 2012-257728 filed on Nov. 26, 2012, the contents of all of which are incorporated herein by reference, in their entirety.

TECHNICAL FIELD

The present invention relates to calculation processing circuits in digital signal processing and, in particular, to a fast Fourier transform circuit.

BACKGROUND ART

As a technique to compensate for waveform distortion which may be caused during signal transmission in wireless or wired communications, frequency domain equalization (FDE) is known. The frequency domain equalization (FDE) uses a fast Fourier transform (FFT), which is one of the most important digital signal processing methods.

The frequency domain equalization (FDE) performs a fast Fourier transform (FFT) on time-domain signal data to convert it into frequency-domain data, filters the data for equalization, and then performs an inverse fast Fourier transform (IFFT) to reconvert the data into a time-domain signal. As a result, the frequency domain equalization (FDE) can compensate for distortion in a signal waveform.

Cooley-Tukey butterfly computation is known as an efficient FFT/IFFT processing method (NPT 1). However, because the Cooley-Tukey FFT/IFFT uses a large number of points requiring a complex circuit, the prime factor method is typically used for decomposition into two smaller FFTs/IFFTs for processing (NPT 2). However, if all the processing as in NPT 2 is to be implemented with a circuit, the circuit would be huge in size. Thus, in practice, the FFT processing is achieved by implementing only a part of the required processing with a circuit depending on the desired performance and by using the circuit repetitively.

A pipelined circuit system is also known to implement the FFT processing. The pipelined circuit system is characterized by the ability to achieve a high throughput (processing performance per unit time) by handling the individual internal processes constituting the FFT processing in a pipelined manner.

PTL 1 discloses a Fourier transform processing device 210 including a Fourier transform mechanism 211 which performs FFT processing on inputted data. The Fourier transform mechanism 211 according to PTL 1, as shown in FIG. 13, includes a first butterfly calculation circuit 220, a complex number multiplier 221, delay elements 222 and 224, a fifth commutator 223, and a second butterfly calculation circuit 225.

The Fourier transform processing device 210 of PTL 1 further includes first and second commutators 215 and 216 which rearrange arrays of inputted data; and first and second memories 213 and 214 which store the data arrays respectively rearranged by the first and second commutators 215 and 216. The Fourier transform processing device 210 further includes second and fourth commutators 217 and 218 which rearrange the data respectively stored in the first and second memories 213 and 214.

In the Fourier transform processing device 210 according to PTL 1, the first and second commutators 215 and 216 rearrange an array of data to be inputted to the first butterfly calculation circuit 220. Accordingly, the Fourier transform processing device 210 according to PTL 1 eliminates the need for delay elements which had been required, before PTL 1 was published, to be disposed before and after a commutator preceding the first butterfly calculation circuit 220. Consequently, the Fourier transform processing device 210 according to PTL 1 can make the device smaller and reduce power consumption.

On the other hand, performance requirements for the FFT processing, such as calculation accuracy or processing throughputs, may change variously. Such change occurs, for example, when modulation schemes are changed depending on the condition of a transmission line in data communications.

A processing throughput required for digital signal processing, such as filtering, is proportional to a symbol rate. Concerning calculation accuracy required for digital signal processing, such as filtering, higher accuracy is needed for a smaller distance between symbols.

In general, calculation accuracy for a digital signal processing circuit is basically determined by the data representation format and bit-width. However, regardless of any representation format, a greater bit-width is needed for higher calculation accuracy. Accordingly, to make a circuit size and power consumption smaller, the data bit-width must be optimized to a necessary and sufficient degree depending on the required calculation accuracy.

CITATION LIST

Patent Literature

[PTL 1] Japanese Unexamined Patent Application Publication No. 2012-89053

Non Patent Literature

[NPL 1] J. W. Cooley, J. W. Tukey, "An Algorithm for the Machine Calculation of Complex Fourier Series," Mathematics of Computation, Vol. 19, No. 90 (1965), pp. 297-301.

[NPL 2] D. P. Kolba, "A Prime Factor FFT Algorithm Using High-Speed Convolution," IEEE Trans. on Acoustics, Speech and Signal Processing, Vol. 29, No. 4 (1981).

SUMMARY OF INVENTION

Technical Problem

Minimizing power consumption for different modulation schemes can be achieved by using different FFT circuits that are individually optimized with respect to processing throughputs and calculation accuracy for different performance requirements depending on the modulation schemes.

However, a circuit configuration such as the Fourier transform processing device of PTL 1 is problematic in that the circuit will be huge in size because the configuration requires a plurality of FFT circuits that are individually optimized with respect to performance requirements for the respective modulation schemes.

On the other hand, a single FFT circuit satisfying all the performance requirements for different modulation schemes is problematic in that power consumption will be high, although the FFT circuit can be made smaller in size than different FFT circuits that are individually optimized.

An object of the present invention is to provide a fast Fourier transform circuit, a fast Fourier transform processing method, and a program, all of which can make both a circuit size and power consumption smaller for FFTs in digital signal processing which involves mixed modulation schemes with different performance requirements, such as processing throughputs and calculation accuracy.

Solution to Problem

A fast Fourier transform circuit according to the present invention includes:
  a first butterfly circuit and a second butterfly circuit which perform butterfly calculations corresponding to calculation bit-widths being different from each other; and
  a control means which controls selection of the first and second butterfly circuits in accordance with any one of a plurality of operation modes including:
    a first operation mode in which a calculation is performed by both of the first and second butterfly circuits; and
    a second operation mode in which a calculation is performed by any one of the first and second butterfly circuits.

A fast Fourier transform circuit according to the present invention performs a Fourier transform to convert time-domain data into a frequency-domain signal, the fast Fourier transform circuit including:
  a first sorting circuit which rearranges the inputted time-domain data based on data dependence in a Fourier transform processing algorithm;
  a first butterfly calculation circuit which performs a first butterfly calculation on data inputted from the first sorting circuit;
  a second sorting circuit which rearranges inputted data based on data dependence in a Fourier transform processing algorithm;
  a twiddle multiplication circuit which handles rotation of a complex number on a complex plane on data inputted from the second sorting circuit;
  a second butterfly circuit which performs a second butterfly calculation on an inputted signal, the second butterfly calculation corresponding to a calculation bit-width being different from that for the first butterfly calculation;
  a third sorting circuit which rearranges the data inputted from the second butterfly circuit based on data dependence in a fast Fourier transform processing algorithm and outputs a frequency-domain signal;
  a first selection circuit which selects either one of data inputted from the first butterfly circuit and data inputted from the second butterfly circuit and outputs the selected data to the second sorting circuit; and
  a second selection circuit which selects either one of data inputted from the twiddle multiplication circuit and data inputted from the first sorting circuit and outputs the selected data to the second butterfly circuit,
  wherein the first and second selection circuits each select a signal to be outputted based on an operation set signal from an upper-level device, and control selection of the first and second butterfly circuits in accordance with any one of a plurality of operation modes including:
    a first operation mode in which a calculation is performed by both of the first and second butterfly circuits; and
    a second operation mode in which a calculation is performed by any one of the first and second butterfly circuits.

A method for processing a fast Fourier transform according to the present invention controls, in a fast Fourier transform circuit which includes a first butterfly circuit and a second butterfly circuit which respectively perform butterfly calculations operating with calculation bit-widths being different from each other, selection of the first and second butterfly circuits in accordance with any one of a plurality of operation modes including:
  a first operation mode in which a calculation is performed by both of the first and second butterfly circuits; and
  a second operation mode in which a calculation is performed by any one of the first and second butterfly circuits.

A program according to the present invention causes a computer, in a fast Fourier transform circuit which includes a first butterfly circuit and a second butterfly circuit which respectively perform butterfly calculations operating with calculation bit-widths being different from each other, to execute a process of controlling selection of the first and second butterfly circuits in accordance with any one of a plurality of operation modes including:
  a first operation mode in which a calculation is performed by both of the first and second butterfly circuits; and
  a second operation mode in which a calculation is performed by any one of the first and second butterfly circuits.

Advantageous Effects of Invention

A fast Fourier transform processing circuit according to the present invention makes it possible to make both a circuit size and power consumption smaller for fast Fourier transforms in digital signal processing which involves mixed modulation schemes with different performance requirements, such as processing throughputs and calculation accuracy.

BRIEF DESCRIPTION OF DRAWINGS

FIG. 9 is a table showing a sequential order.

DESCRIPTION OF EMBODIMENTS

Figure 7:
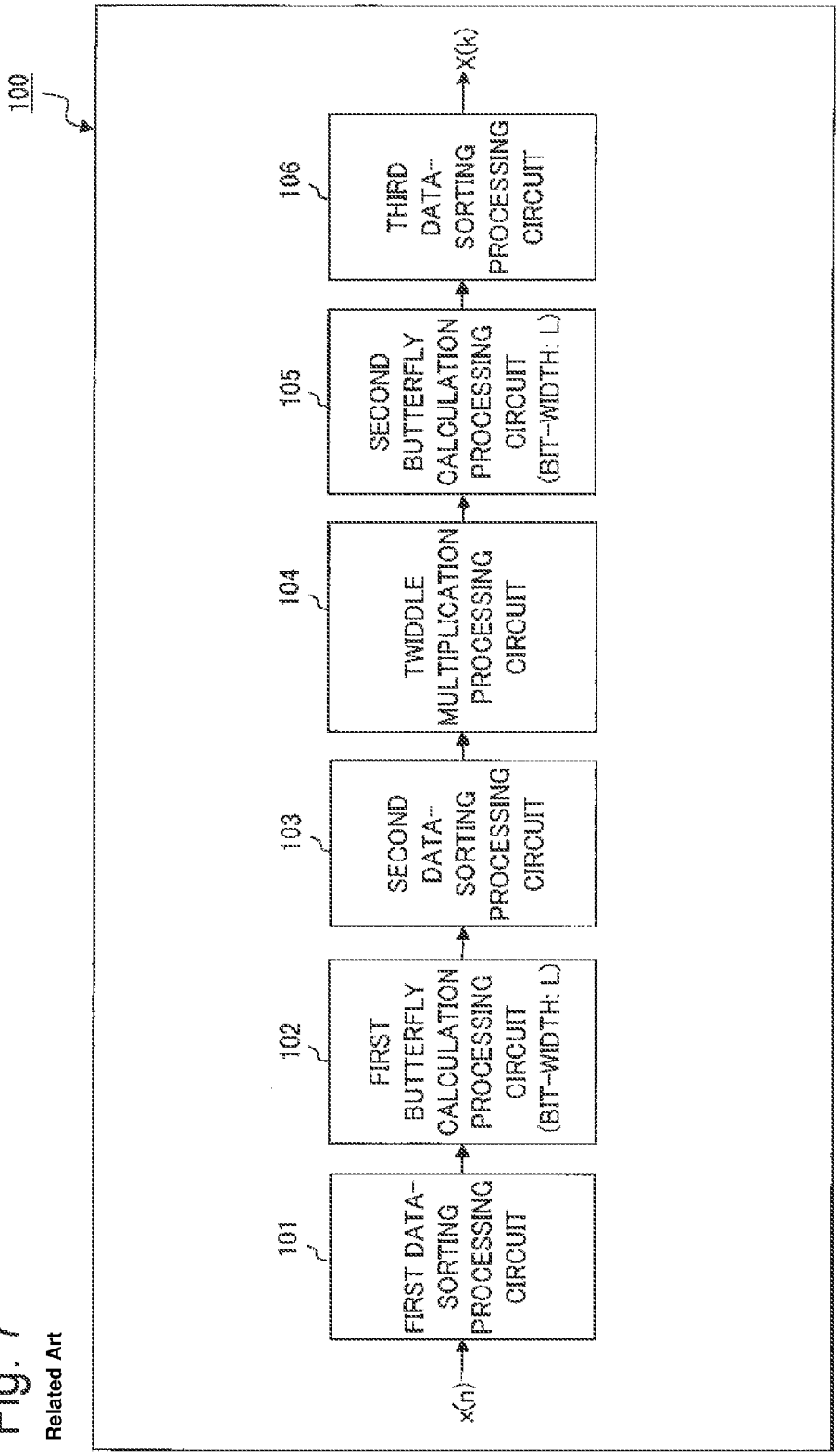
FIG. 7 is a block diagram illustrating an example configuration of an FFT circuit.

Exemplary embodiments of the present invention will now be described with reference to the drawings. It should be noted that the following embodiments have technically preferable limitations for carrying out the present invention, but the scope of the present invention is not limited thereto.
(Pipelining)
Before starting descriptions about exemplary embodiment of the present invention, pipelining with FFT processing is described below with reference to FIGS. 7 to 11.
(Configuration)
First, an example configuration of the FFT circuit based on a pipelined circuit system is described with reference to FIG. 7. In FIG. 7, an FFT circuit 100 inputs time-domain data x(n), generates a frequency-domain signal X(k) through a Fourier transform in the FFT processing, and outputs the signal (where n=0, 1, . . . , N−1; and k=0, 1, . . . , N−1). N is a positive integer representing the FFT block size.

Figure 8:
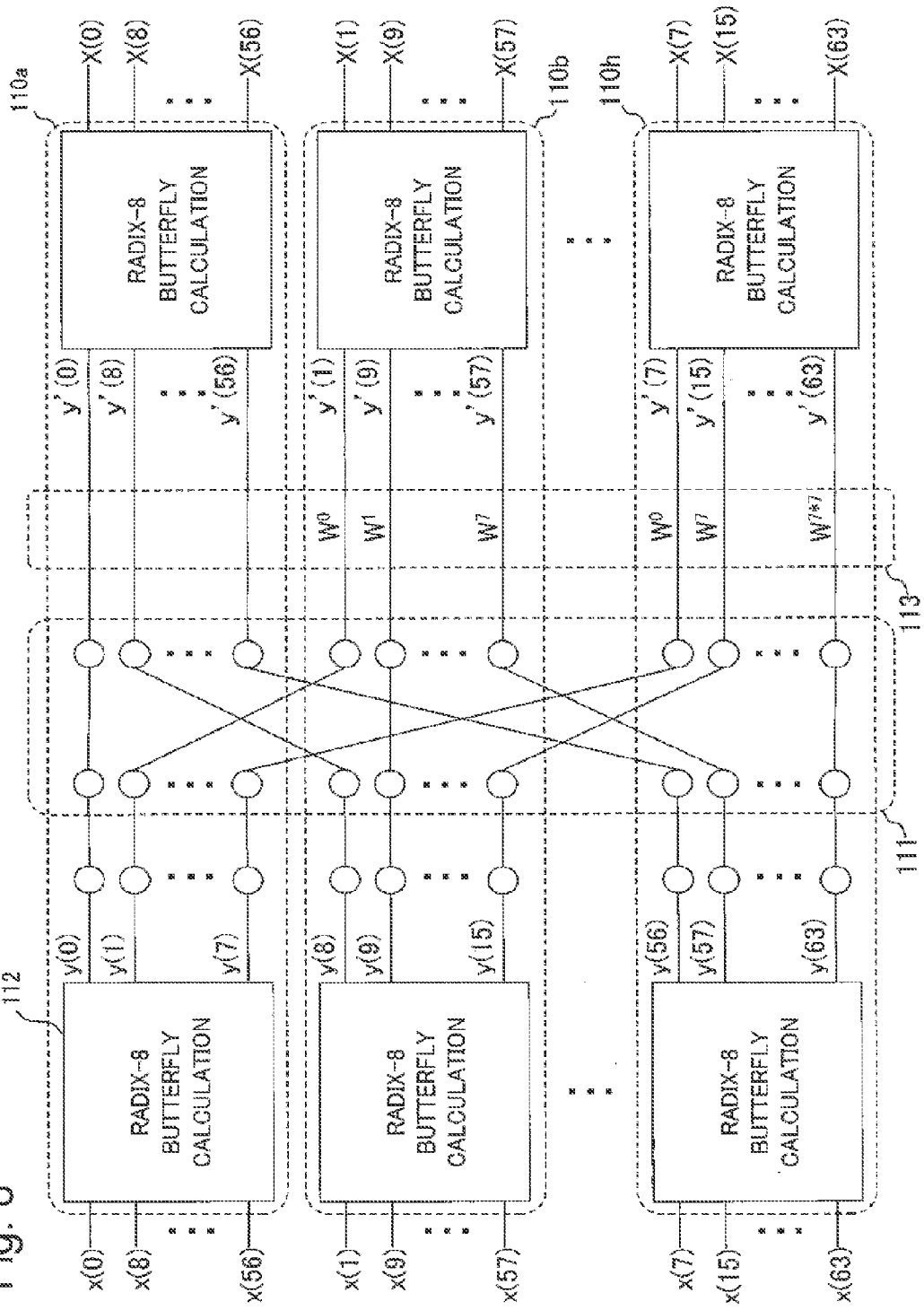
FIG. 8 is a data-flow diagram related to butterfly processing.

FIG. 8 is a data-flow diagram showing a 64-point FFT/IFFT decomposed into two-stage radix-8 butterfly processing 112 by utilizing the prime factor method. In FIG. 8, the FFT/IFFT inputs time-domain data x(n) and outputs a frequency-domain signal X(k) produced through FFT processing (where k=0, 1, . . . , 63). Note that the data-flow illustration is partly omitted.

If all the processes in this data-flow diagram are implemented by circuits, the circuit size will be huge. Thus, it is practically possible to use a method for the FFT processing by implementing only a part of the processing with circuits depending on the desired processing performance and by using the circuits repetitively.

For example, in FIG. 8, implementing the FFT circuit 100, which handles FFT processing in 8-bit parallel, as a physical circuit can achieve the 64-point FFT/IFFT by repeating the processing eight times in total. Specifically, the FFT circuit 100 carries out a 1st process corresponding to a partial data-flow 110a followed by a 2nd process corresponding to a partial data-flow 110b. Similarly, the FFT circuit 100 carries out 3rd to 7th processes and finally performs an 8th process corresponding to a partial data-flow 110h. In this way, the circuit can achieve the 64-point FFT/IFFT processing.

Specifically, referring to the example in FIG. 8, in order to perform the 64-point FFT processing in 8-data parallel, the FFT circuit 100 inputs time-domain data x(n), generates a frequency-domain signal X(k) through a Fourier transform in the FFT processing, and outputs the signal (where k= 0, 1, . . . , 63). It is assumed that the input data x(n), which is 64 pieces of data, is inputted in the order shown in the sequential order table 80 in FIG. 9 in units of 8 pieces of data at a time during the period of 8 cycles. Each number in the sequential order table 80 in FIG. 9 is the parenthesized value n in x(n). Specifically, at the 1st cycle, 8 pieces of data x(0), x(1), . . . , x(7) constituting a dataset A are inputted. At the 2nd cycle, 8 pieces of data x(8), x(9), . . . , x(15) constituting a dataset B are inputted. Similarly, at every cycle from the 3rd to 8th cycles, the pieces of data respectively constituting datasets C to H are inputted.

Likewise, the output data X(k), which is 64 pieces of data, is outputted in the order shown in the sequential order table 80 in FIG. 9 in units of 8 pieces of data at a time during the period of 8 cycles. Each number in the sequential order table 80 in FIG. 9 is the parenthesized value k in X(k). Specifically, at the 1st cycle, 8 pieces of data X(0), X(1), . . . , X(7) constituting a dataset A are outputted. At the 2nd cycle, 8 pieces of data X(8), X(9), . . . , X(15) constituting a dataset B are outputted.

Similarly, at every cycle from the 3rd to 8th cycles, the pieces of data respectively constituting datasets C to H are outputted.

The FFT circuit 100 in FIG. 7 includes a first data-sorting processing circuit 101, a first butterfly calculation processing circuit 102, a second data-sorting processing circuit 103, a twiddle multiplication processing circuit 104, a second butterfly calculation processing circuit 105, and a third data-sorting processing circuit 106. The FFT circuit 100 performs the first data-sorting processing, the first butterfly calculation processing, the second data-sorting processing, the twiddle multiplication processing, the second butterfly calculation processing, and the third data-sorting processing in the above-described respective components in a pipelined manner.

The first, second, and third data-sorting processing circuits 101, 103, and 106 are buffer circuits for rearranging data. The first, second, and third data-sorting processing circuits 101, 103, and 106 respectively rearrange a data sequence before or after a butterfly calculation processing circuit based on data dependence in the FFT processing algorithm.

The first and second butterfly calculation processing circuits 102 and 105 perform the butterfly calculations constituting the FFT processing. Specifically, the first data-sorting processing circuit 101 rearranges the input order of the input data x(n) shown in the sequential order table 80 in FIG. 9 into the order shown in the bit reverse order table 90 in FIG. 10. The input order of the input data x(n) shown in the sequential order table 80 in FIG. 9 is hereinafter denoted as sequential order and the order shown in the bit reverse order table 90 in FIG. 10 is hereinafter denoted as bit reverse order.

Figure 10:
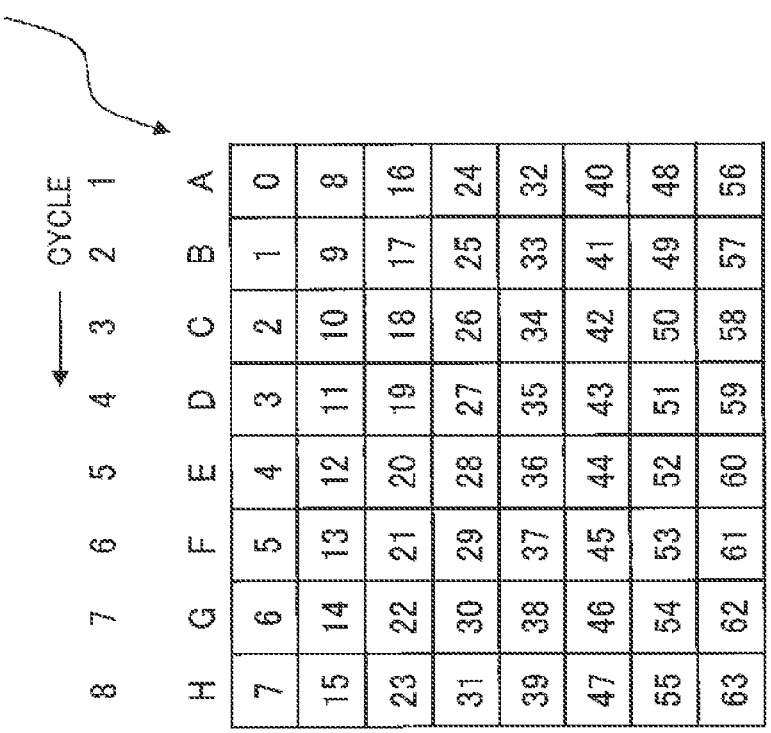
FIG. 10 is a table showing a bit reverse order.

The bit reverse order shown in the bit reverse order table 90 in FIG. 10 corresponds to the datasets in the 1st stage (left side) inputted to the radix-8 butterfly processing 112, as illustrated in the data-flow diagram in FIG. 8. Specifically, at the 1st cycle, 8 pieces of data x(0), x(8), . . . , x(56) constituting a dataset A are inputted. Next, at the 2nd cycle, 8 pieces of data x(1), x(9), . . . , x(57) constituting a dataset B are inputted. Similarly, at every cycle from the 3rd to 8th cycles, the pieces of data respectively constituting datasets C to H are inputted.

The first butterfly calculation processing circuit 102 is a butterfly circuit which performs the radix-8 butterfly processing 112 in the 1st stage (left side), as illustrated in the data-flow diagram in FIG. 8. The first butterfly calculation processing circuit 102 outputs the results of the butterfly calculation, as data y(n), in the sequential order shown in FIG. 9 (where n=0, 1, . . . , 63).

The second data-sorting processing circuit 103 rearranges the data y[n] outputted from the first butterfly calculation processing circuit 102 in the sequential order (FIG. 9) into the bit reverse order (FIG. 10); in this order the data will be inputted to the second butterfly calculation processing circuit 105. The second data-sorting processing circuit 103 corresponds to the data-sorting processing 111 in FIG. 8.

After the first butterfly calculation processing, the twiddle multiplication processing circuit 104 handles rotation of a complex number on the complex plane for FFT calculation. The twiddle multiplication processing circuit 104 corresponds to the twiddle multiplication processing 113 in FIG. 8.

The second butterfly calculation processing circuit 105 is a butterfly circuit which handles the radix-8 butterfly processing 112 in the 2nd stage (right side), as illustrated in the data-flow diagram in FIG. 8. The second butterfly calculation processing circuit 105 performs the butterfly calculation on data y'(n), which is produced through the twiddle multiplication and is inputted in the bit reverse order shown in FIG. 10, and outputs the results X(k) in the bit reverse order shown in FIG. 10 (where n=0, 1, . . . , 63).

The third data-sorting processing circuit 106 rearranges the data X(k) outputted from the second butterfly calculation processing circuit 105 in the bit reverse order shown in FIG. 10 into the sequential order shown in FIG. 9, which is the order of the FFT processing results outputted from the FFT circuit 100.

(Operation)

Figure 11:
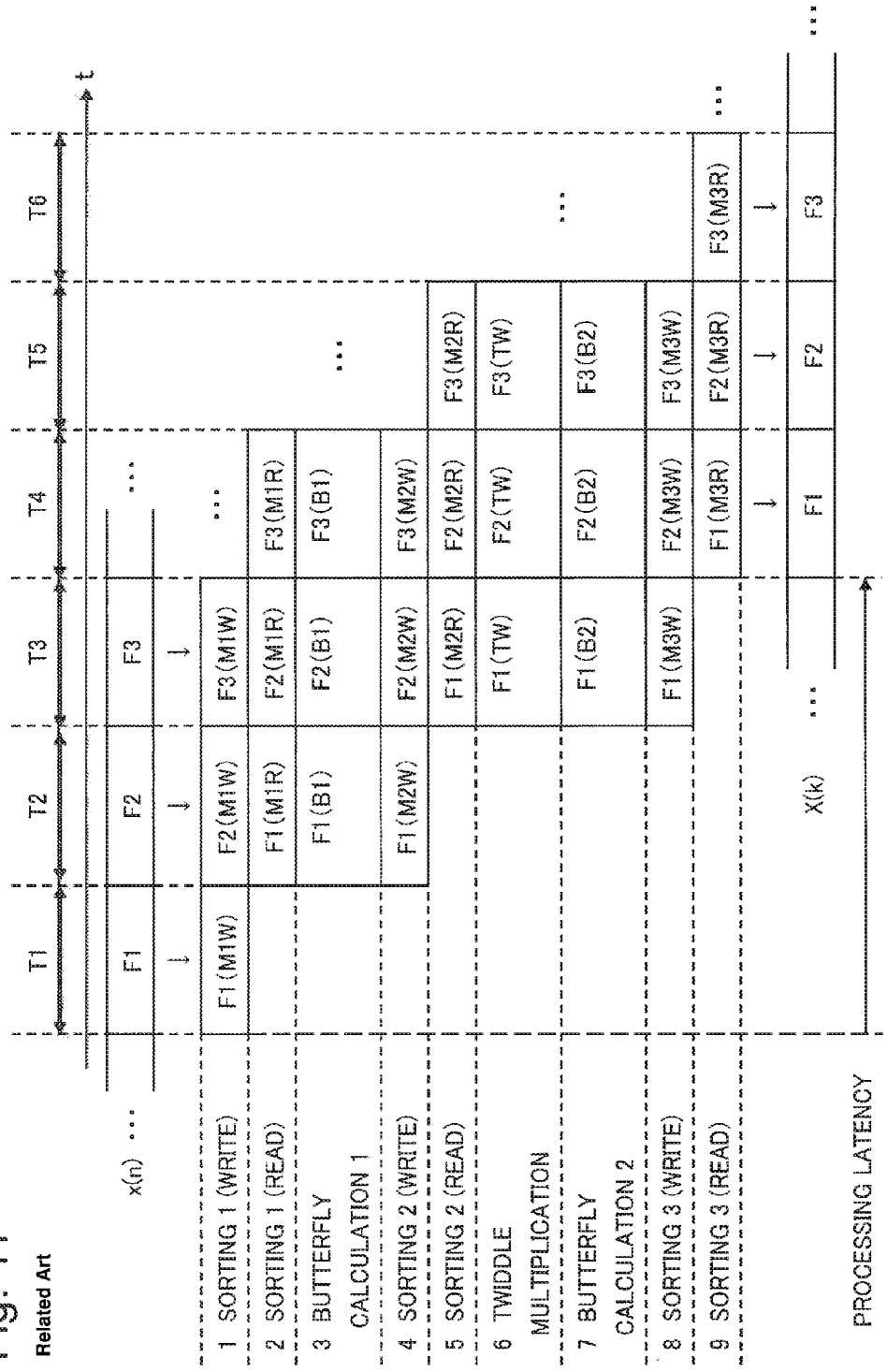
FIG. 11 is a timing diagram illustrating example operations of an FFT circuit.

Example operations of the FFT circuit 100 will now be described with reference to FIG. 11. FIG. 11 is a timing diagram showing operations of the FFT circuit 100. FIG. 11 illustrates processes carried out during times T1 to T6 on FFT blocks F1, F2, and F3, where an FFT block is a unit of the FFT processing. The FFT blocks F1 to F3 are equivalent to data blocks produced by dividing the inputted time-domain signal x(n) into blocks each having an FFT block size.

(Internal Process)

FIG. 11 shows the FFT processing divided into internal processes (1) to (9).

(1) The sorting 1 (write) is the writing processing of data into the first data-sorting processing circuit 101.

(2) The sorting 1 (read) is the reading processing of the data rearranged by the first data-sorting processing circuit 101.

(3) The butterfly calculation 1 is the first butterfly calculation performed by the first butterfly calculation processing circuit 102.

(4) The sorting 2 (write) is the writing processing of data into the second data-sorting processing circuit 103.

(5) The sorting 2 (read) is the reading processing of the data rearranged by the second data-sorting processing circuit 103.

(6) The twiddle multiplication is the twiddle multiplication processing performed by the twiddle multiplication processing circuit 104.

(7) The butterfly calculation 2 is the second butterfly calculation performed by the second butterfly calculation processing circuit 105.

(8) The sorting 3 (write) is the writing processing of data into the third data-sorting processing circuit 106.

(9) The sorting 3 (read) is the reading processing of the data rearranged by the third data-sorting processing circuit 106.

The foregoing are descriptions about the pipelined internal processes in the FFT circuit 100 illustrated in FIG. 7.

Processing during the individual processing periods is now described in detail. The following descriptions refer to the timing diagram in FIG. 11.

(T1)

The following descriptions are about the processing performed during the time T1 processing period.

The FFT circuit 100 (FIG. 7) inputs the input data x(n) constituting the FFT block F1 into the first data-sorting processing circuit 101. The first data-sorting processing circuit 101 performs the sorting 1 (write) on the FFT block F1 (F1 (M1W)).

(T2)

The following descriptions are about the processing performed during the time T2 processing period.

The FFT circuit 100 inputs the input data x(n) constituting the FFT block F2 into the first data-sorting processing circuit 101. The first data-sorting processing circuit 101 performs the sorting 1 (write) on the FFT block F2 (F2 (M1W)).

In addition, the first data-sorting processing circuit 101 performs the sorting 1 (read) on the FFT block F1 produced through the processing in T1 (F1 (M1R)). This sorting 1 (read) is performed by the first data-sorting processing circuit 101 to read the data in an order different from the order used for the sorting 1 (write) to write the data. That is, the first data-sorting processing circuit 101 rearranges a data sequence based on data dependence in the FFT processing algorithm.

In addition, the first butterfly calculation processing circuit 102 performs the butterfly calculation 1 on the FFT block F1 that has undergone the sorting 1 (read) (F1 (B1)).

Next, the second data-sorting processing circuit 103 performs the sorting 2 (write) on the FFT block F1 that has undergone the butterfly calculation 1 (F1 (M2W)).

(T3)

Similarly to the foregoing, the processing performed during the time T3 processing period is described below.

The FFT circuit 100 inputs the input data x(n) constituting the FFT block F3 into the first data-sorting processing circuit 101. The first data-sorting processing circuit 101 performs the sorting 1 (write) on the FFT block F3 (F3 (M1W)).

In addition, the first data-sorting processing circuit 101 performs the sorting 1 (read) on the FFT block F2 (F2 (M1R)). The first butterfly calculation processing circuit 102 performs the butterfly calculation 1 on the FFT block F2 that has undergone the sorting 1 (read) (F2 (B1)). The second data-sorting processing circuit 103 performs the sorting 2 (write) on the FFT block F2 that has undergone the butterfly calculation 1 (F2 (M2W)).

In addition, the second data-sorting processing circuit 103 performs the sorting 2 (read) on the FFT block F1 (F1 (M2R)). The twiddle multiplication processing circuit 104 proceeds to perform the twiddle multiplication on the FFT block F1 that has undergone the sorting 2 (read) (F1 (TW)). The second butterfly calculation processing circuit 105 performs the butterfly calculation 2 on the FFT block F1 that has undergone the twiddle multiplication (F1 (B2)). The third data-sorting processing circuit 106 performs the sorting 3 (write) on the data that has undergone the butterfly calculation 2 (F1 (M3W)).

(T4)

The following descriptions are about the processing performed during the time T4 processing period.

The first data-sorting processing circuit 101 performs the sorting 1 (read) on the FFT block F3 (F3 (M1R)). The first butterfly calculation processing circuit 102 performs the butterfly calculation 1 on the FFT block F3 that has undergone the sorting 1 (read) (F3 (B1)). The second data-sorting processing circuit 103 proceeds to perform the sorting 2 (write) on the FFT block F3 (F3 (M2W)).

In addition, the second data-sorting processing circuit 103 performs the sorting 2 (read) on the FFT block F2 (F2 (M2R)). The twiddle multiplication processing circuit 104 performs the twiddle multiplication on the FFT block F2 that has undergone the sorting 2 (read) (F2 (TW)). Next, the second butterfly calculation processing circuit 105 performs the butterfly calculation 2 on the FFT block F2 that has undergone the twiddle multiplication (F2 (B2)). In addition, the third data-sorting processing circuit 106 proceeds to perform the sorting 3 (write) on the FFT block F2 that has undergone the butterfly calculation 2 (F2 (M3W)).

In addition, the third data-sorting processing circuit 106 performs the sorting 3 (read) on the FFT block F1 (F1 (M3R)). When the FFT processing on the FFT block F1 is finished, the FFT circuit 100 outputs the resulting data as frequency-domain data X(k) (F1).

(T5)

The following descriptions are about the processing performed during the time T5 processing period.

The second data-sorting processing circuit 103 performs the sorting 2 (read) on the FFT block F3 (F3 (M2R)). The twiddle multiplication processing circuit 104 performs the twiddle multiplication on the FFT block F3 that has undergone the sorting 2 (read) (F3 (TW)). The second butterfly calculation processing circuit 105 performs the butterfly calculation 2 on the FFT block F3 that has undergone the twiddle multiplication (F3 (B2)). The third data-sorting processing circuit 106 performs the sorting 3 (write) on the FFT block F3 that has undergone the butterfly calculation 2 (F3 (M3W) in FIG. 11).

In addition, the third data-sorting processing circuit 106 performs the sorting 3 (read) on the FFT block F2 (F2 (M3R)). When the FFT processing on the FFT block F2 is finished, the FFT circuit 100 outputs the resulting data as frequency-domain data X(k) (F2).

(T6)

The following descriptions are about the processing performed during the time T6 processing period.

The third data-sorting processing circuit 106 performs the sorting 3 (read) on the FFT block F3 (F3 (M3R)). When the FFT processing on the FFT block F3 is finished, the FFT circuit 100 outputs the resulting data as frequency-domain data X(k) (F3).

The above descriptions are about the processing on the FFT blocks F1 to F3, but they also apply to the FFT blocks subsequent to F3.

As seen above, the FFT circuit 100 achieves high throughput performance by processing a plurality of FFT blocks in a pipelined manner to successively handle input data.

(Modulation Scheme)

Figure 12:
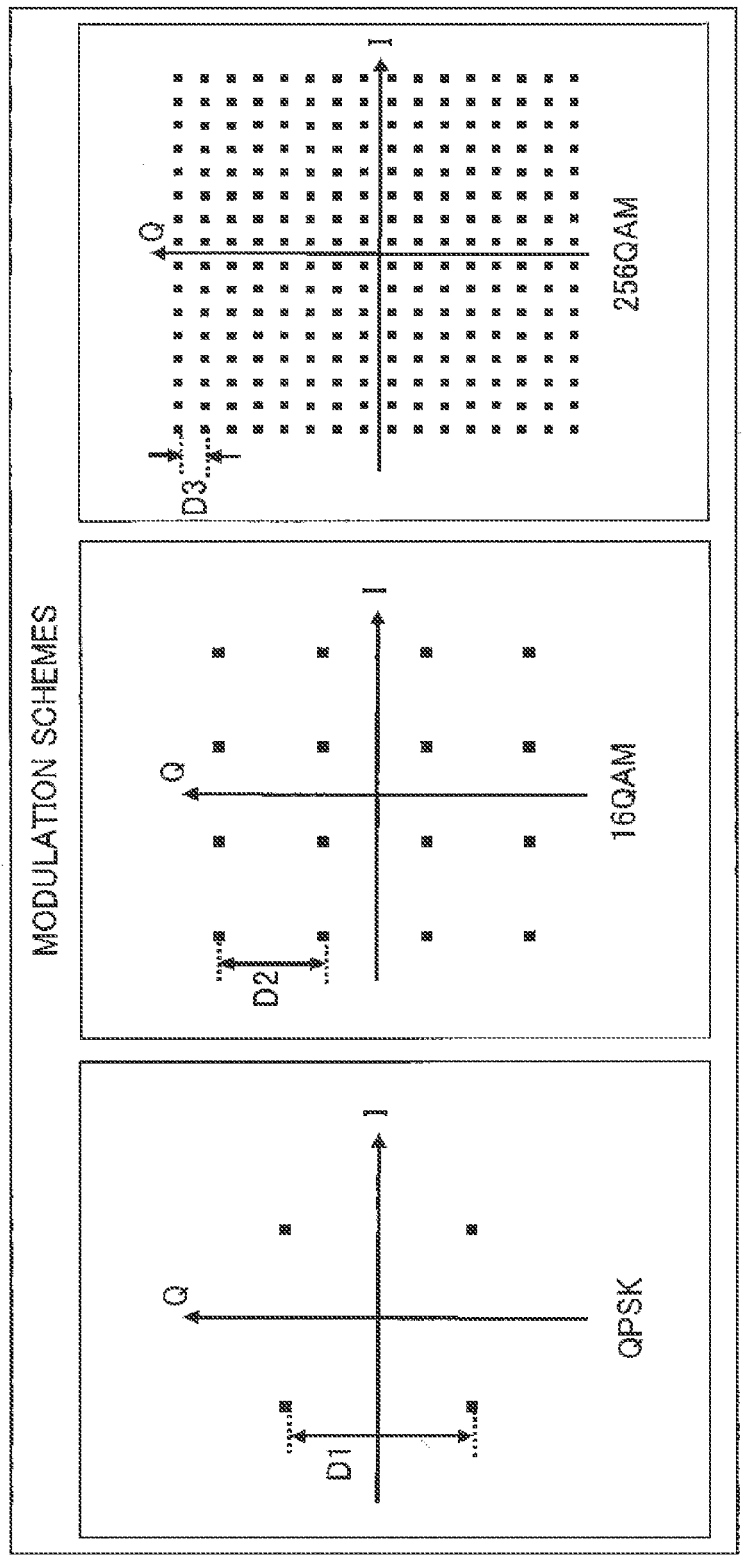
FIG. 12 is an explanatory diagram showing example modulation schemes in data communications.
Figure 13:
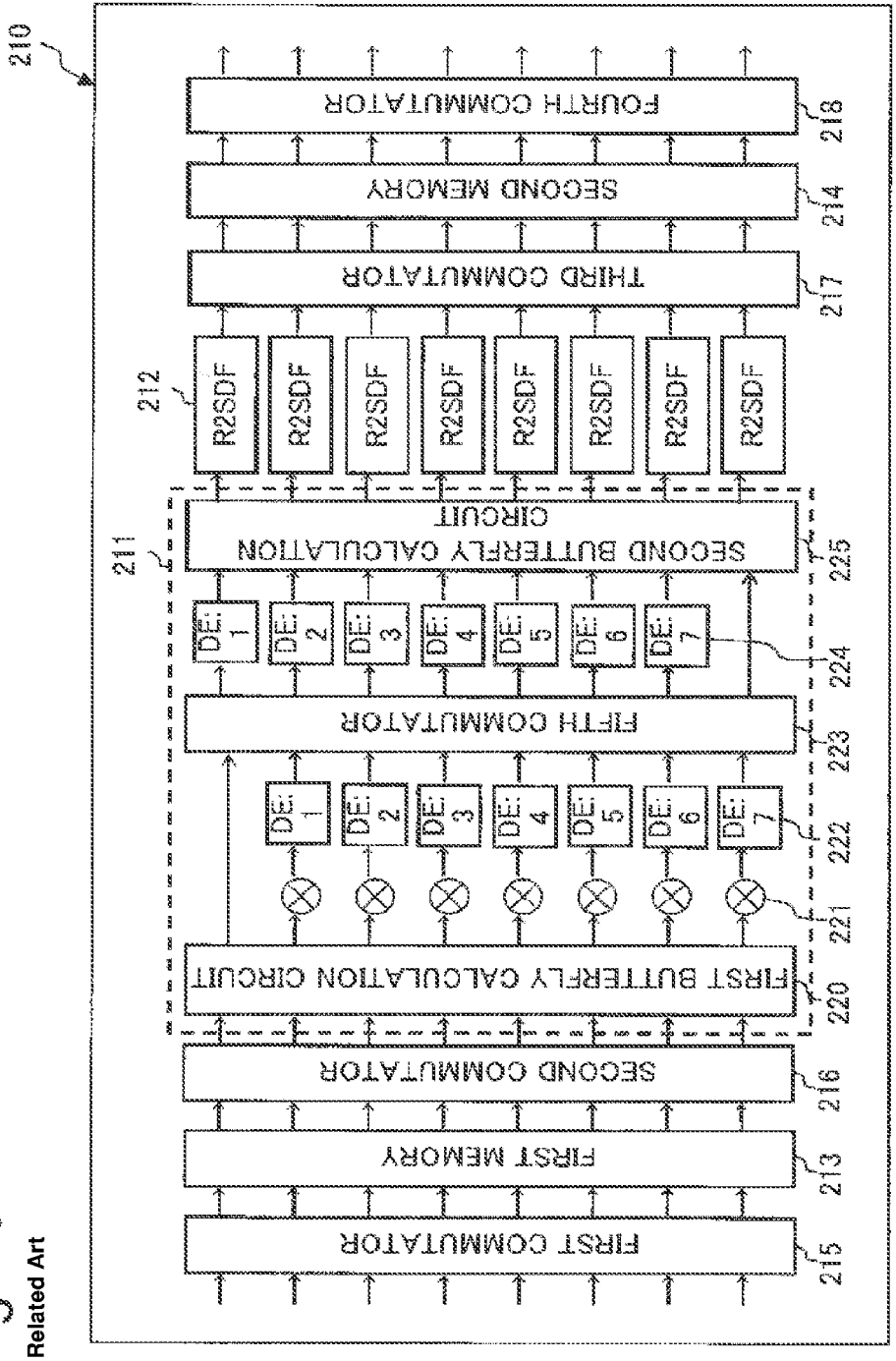
FIG. 13 is a block diagram illustrating a configuration of the Fourier transform processing device according to PTL 1.

Some example modulation schemes, namely QPSK, 16 QAM, and 256 QAM are now described with reference to FIG. 12 (QPSK: Quadrature Phase Shift Keying, 16 QAM: 16 Quadrature Amplitude Modulation, 256 QAM: 256 Quadrature Amplitude Modulation).

The QPSK scheme allocates four values to one symbol, and thus can transmit 2-bit information per symbol. The 16 QAM scheme allocates 16 values to one symbol, and thus can transmit 4-bit information per symbol. The 256 QAM scheme allocates 256 values to one symbol, and thus can transmit 8-bit information per symbol.

That is, compared with the QPSK scheme, the 16 QAM scheme can transmit twice the information per symbol, and thus can achieve the same transmission speed at half the symbol rate. Similarly, compared with the 16 QAM scheme, the 256 QAM scheme can transmit twice the information per symbol, and thus can achieve the same transmission speed at half the symbol rate.

A processing throughput required for digital signal processing, such as filtering, is proportional to the symbol rate. Thus, assuming that a constant transmission rate is achieved, the ratios of a processing throughput required for the FFT processing are the QPSK scheme: 1, the 16 QAM scheme: ½, and the 256 QAM scheme: ¼.

On the other hand, as the 16 QAM scheme allocates more values to one symbol than the QPSK scheme, the distance between symbols in 16 QAM (D2) is smaller than the distance between symbols in QPSK (D1) (D1>D2). Likewise, the distance between symbols in the 256 QAM scheme (D3), which allocates more values to a symbol, is smaller than the distance between symbols in the 16 QAM scheme (D2) (D2>D3).

In digital signal processing, such as filtering, higher calculation accuracy is required for a smaller distance between symbols. Accordingly, the 16 QAM scheme needs to achieve higher accuracy, and the 256 QAM scheme needs to achieve much higher accuracy, than the QPSK scheme in the FFT processing as well.

Calculation accuracy for a digital signal processing circuit is basically determined by the data representation format and bit-width.

Typical data representation formats used for digital signal processing include floating point, fixed point, and block floating point formats.

The floating point format has an advantage of high-precision calculation in spite of a wide range of signal data values to be handled, but is problematic in that the format requires a complex circuit and thus results in a large circuit and high power consumption.

The fixed point format has an advantage of a simple circuit and thus a small circuit and low power consumption, but is problematic in that the format leads to low-precision calculation when it handles a wide range of signal data values.

On the other hand, the block floating point format provides an arithmetic having both advantages of the floating point and fixed point formats. In the block floating point arithmetic, a plurality of signal data pieces are grouped into a block and the whole block is normalized so that every block has a common exponent.

Regardless of any representation format, a greater bit-width is needed for higher calculation accuracy. Accordingly, to make a circuit size and power consumption smaller, the data bit-width must be optimized to a necessary and sufficient degree depending on the required calculation accuracy.

An assumption is now made that the circuit size and power consumption are made smaller by optimizing a configuration of the FFT circuit for a plurality of modulation schemes. For example, if the FFT circuit supports the QPSK and 16 QAM schemes, a higher processing throughput and lower calculation accuracy are required for the QPSK scheme compared with 16 QAM. On the other hand, a lower processing throughput and higher calculation accuracy are required for the 16 QAM scheme compared with QPSK. In other words, a greater data bit-width provides higher calculation accuracy but leads to a lower processing throughput.

Modulation schemes have been described above.

FFT circuits according to exemplary embodiments of the present invention will now be described below with reference to the drawings.

(Exemplary Embodiment)

(Configuration)

Figure 1:
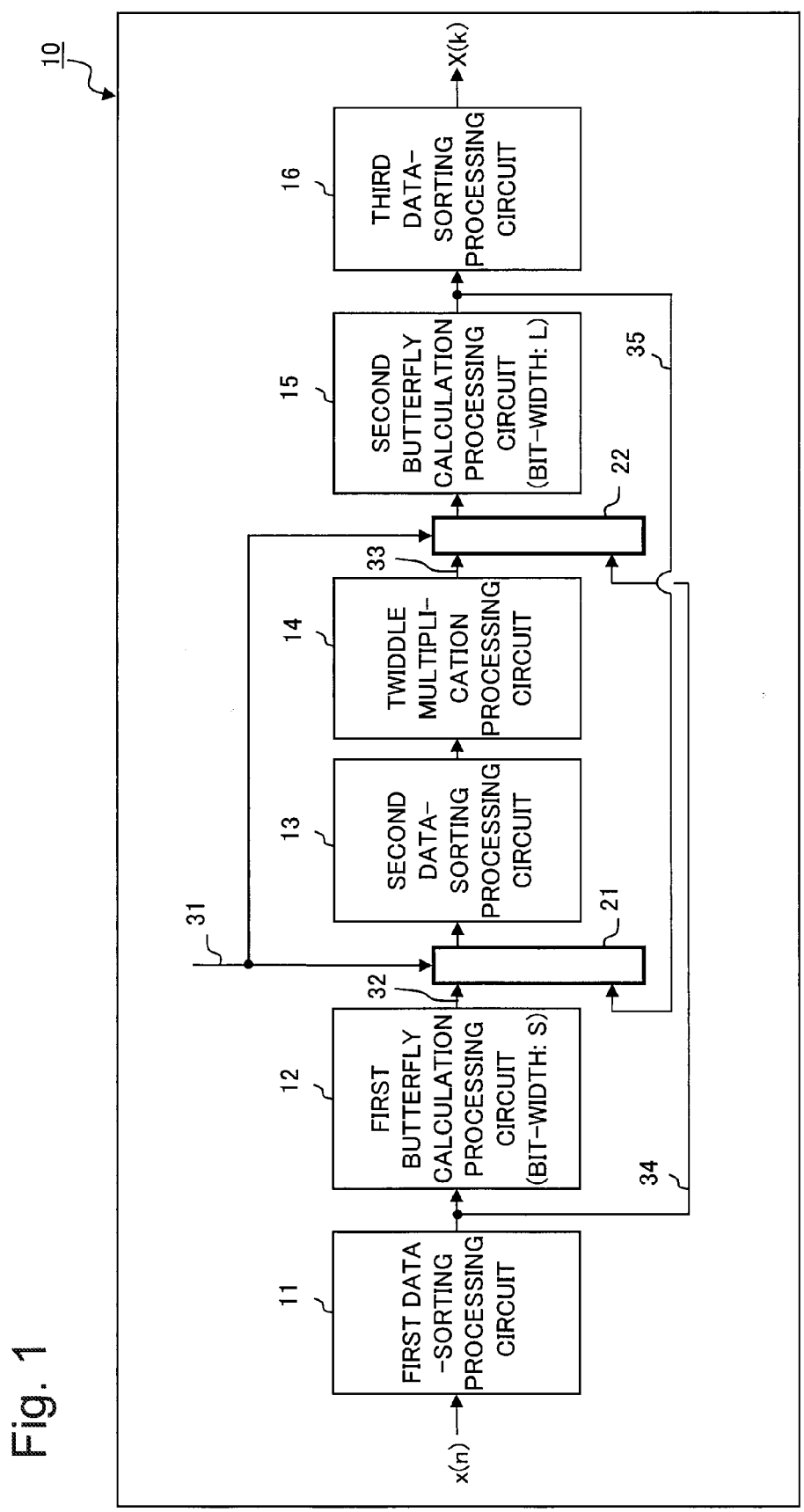
FIG. 1 is a block diagram illustrating a configuration of an FFT circuit according to an exemplary embodiment of the present invention.

FIG. 1 is a block diagram illustrating an example configuration of an FFT circuit 10 according to a first exemplary embodiment of the present invention.

The FFT circuit 10 in FIG. 1, which is a pipelined FFT circuit, inputs time-domain data x(n), generates a frequency-domain signal produced through a Fourier transform in the FFT processing, and outputs the signal as data X(k), where N is a positive integer representing an FFT block size (n=0, 1, . . . , N−1; k=0, 1, . . . , N−1).

The FFT circuit 10 includes a first data-sorting processing circuit 11, a first butterfly calculation processing circuit 12, a second data-sorting processing circuit 13, a twiddle multiplication processing circuit 14, a second butterfly calculation processing circuit 15, and a third data-sorting processing circuit 16. In addition, the FFT circuit 10 includes a first data selection circuit 21 and a second data selection circuit 22. The components of the identical names to those in FIG. 7 perform the identical processing to those in FIG. 7.

The first, second, and third data-sorting processing circuits 11, 13, and 16 are buffer circuits for rearranging data. The first, second, and third data-sorting processing circuits 11, 13, and 16 respectively rearrange a data sequence before or after a butterfly calculation processing circuit based on data dependence in the FFT processing algorithm.

The first and second butterfly calculation processing circuits 12 and 15 perform the butterfly calculations constituting the FFT processing.

Subsequently to the first butterfly calculation processing, the twiddle multiplication processing circuit 14 handles rotation of a complex number on the complex plane for FFT calculation.

The first and second data selection circuits 21 and 22 each reference an operation set signal 31 given from an upper-level circuit (not shown), such as a central processing unit (CPU), to select data. Note that the first and second data selection circuits 21 and 22 are included in the control means for controlling selection of the first and second butterfly calculation processing circuit 12 and 15 in accordance with any one of a plurality of operation modes that include the first and second operation modes described below.

Specifically, the first data selection circuit 21 references the operation set signal 31 to select either one of the inputted first data signal 32 and the fourth data signal 35, and then outputs the selected signal to the second data-sorting processing circuit 13.

The second data selection circuit 22 references the operation set signal 31 to select either one of the inputted second data signal 33 and the third data signal 34, and then outputs the selected signal to the second butterfly calculation processing circuit 15.

The operation set signal 31 specifies the operation mode for the FFT circuit 10. Specifically, the operation set signal 31 specifies either one of the two operation modes: the operation mode 1 for lower calculation accuracy and higher processing throughputs, and the operation mode 2 for higher calculation accuracy and lower processing throughputs.

An upper-level circuit (not shown), such as a CPU, specifies a value of the operation set signal 31 depending on, for example, the modulation scheme.

Specifically, if the FFT processing is required to provide lower calculation accuracy and a higher processing throughput like the QPSK scheme, the upper-level circuit sets a value indicating the operation mode 1 to the operation set signal 31.

If the FFT processing is required to provide higher calculation accuracy and a lower processing throughput like the 16 QAM scheme, the upper-level circuit sets a value indicating the operation mode 2 to the operation set signal 31.

The first butterfly calculation processing circuit 12 is implemented by a circuit having a bit-width of S, as a calculation bit-width necessary and sufficient for achieving lower calculation accuracy required in the operation mode 1. The first butterfly calculation processing circuit 12 performs the first butterfly calculation corresponding to the bit-width of S, where S is an integer equal to or greater than 1.

On the other hand, the second butterfly calculation processing circuit 15 is implemented by a circuit having a bit-width of L, as a calculation bit-width necessary and sufficient for achieving higher calculation accuracy required in the operation mode 2. The second butterfly calculation processing circuit 15 performs the second butterfly calculation corresponding to the bit-width of L, where L is an integer equal to or greater than 1. Furthermore, L is an integer different from S and greater than S.

The bit-width S for the first butterfly calculation processing circuit 12 is smaller than the bit-width L for the second butterfly calculation processing circuit 15. Accordingly, the first butterfly calculation processing circuit 12 can achieve a smaller circuit size and less power consumption than the second butterfly calculation processing circuit 15.

The FFT circuit 100 as shown in FIG. 7 operates on circuits of a constant bit-width. If the FFT circuit 100, as shown in FIG. 7, is composed of circuits having a bit-width of L only, unnecessary power will be consumed for lower calculation accuracy as in the QPSK scheme, because this FFT circuit always operates at higher calculation accuracy. If, for example, the FFT circuit 100 as shown in FIG. 7 is composed of circuits having a bit-width of S only, the circuit fails to perform higher accuracy calculations required for 16 QAM or other schemes.

In contrast, the FFT circuit 10 according to the present exemplary embodiment of the present invention can reduce power consumption when higher calculation accuracy is unnecessary, by using both of the circuit having a bit-width of S (smaller bit width) and the circuit having a bit-width of L. When higher calculation accuracy is needed, the present embodiment achieves the highly accurate calculation by efficiently using the single circuit having a bit-width of L.

(Operation)

Operations of the FFT circuit 10 shown in FIG. 1 will now be described with reference to FIGS. 2 to 5.

(Operation Mode 1)

Figure 2:
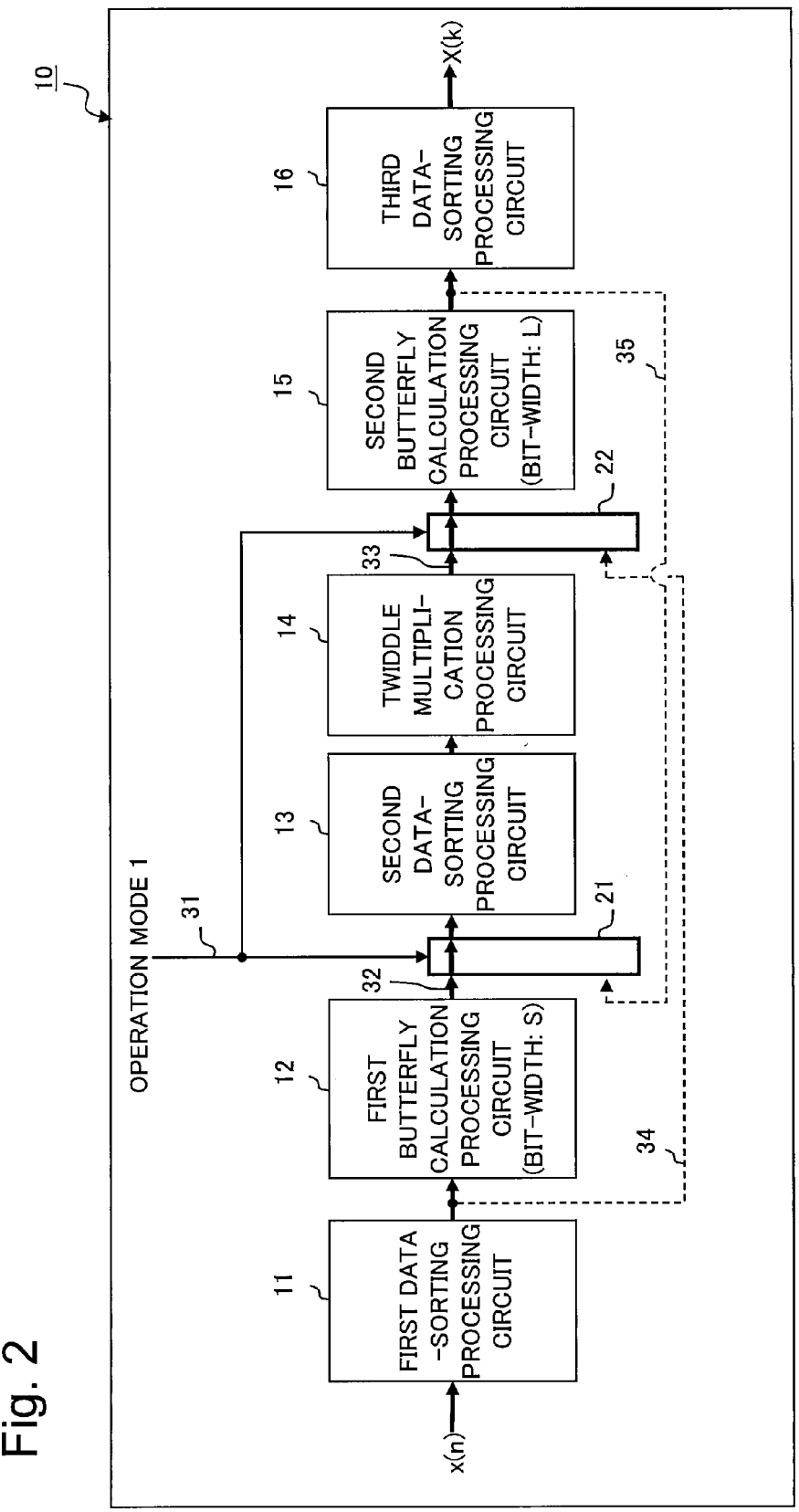
FIG. 2 is a block diagram illustrating operations of an FFT circuit according to an exemplary embodiment of the present invention.

FIG. 2 is a block diagram illustrating operations in the operation mode 1 of the FFT circuit 10 shown in FIG. 1.

In FIG. 2, the operation set signal 31 is set to a value indicating the operation mode 1, and thus the FFT circuit 10 is operating in the operation mode 1. In FIG. 2, among circuits and data signals constituting the FFT circuit 10, the circuits and data signals actually being active in the operation mode 1 are indicated in solid lines, while the inactive circuits and data signals are indicated in dotted lines.

In the operation mode 1, the first data selection circuit 21 always selects the inputted first data signal 32 and outputs it to the second data-sorting processing circuit 13. That is, the other input, namely the fourth data signal 35, is not used.

In the operation mode 1, the second data selection circuit 22 always selects the inputted second data signal 33 and outputs it to the second butterfly calculation processing circuit 15. That is, the other input, namely the third data signal 34, is not used.

Next, example operations of the FFT circuit 10 in the operation mode 1 will now be described with reference to FIG. 3.

Figure 3:
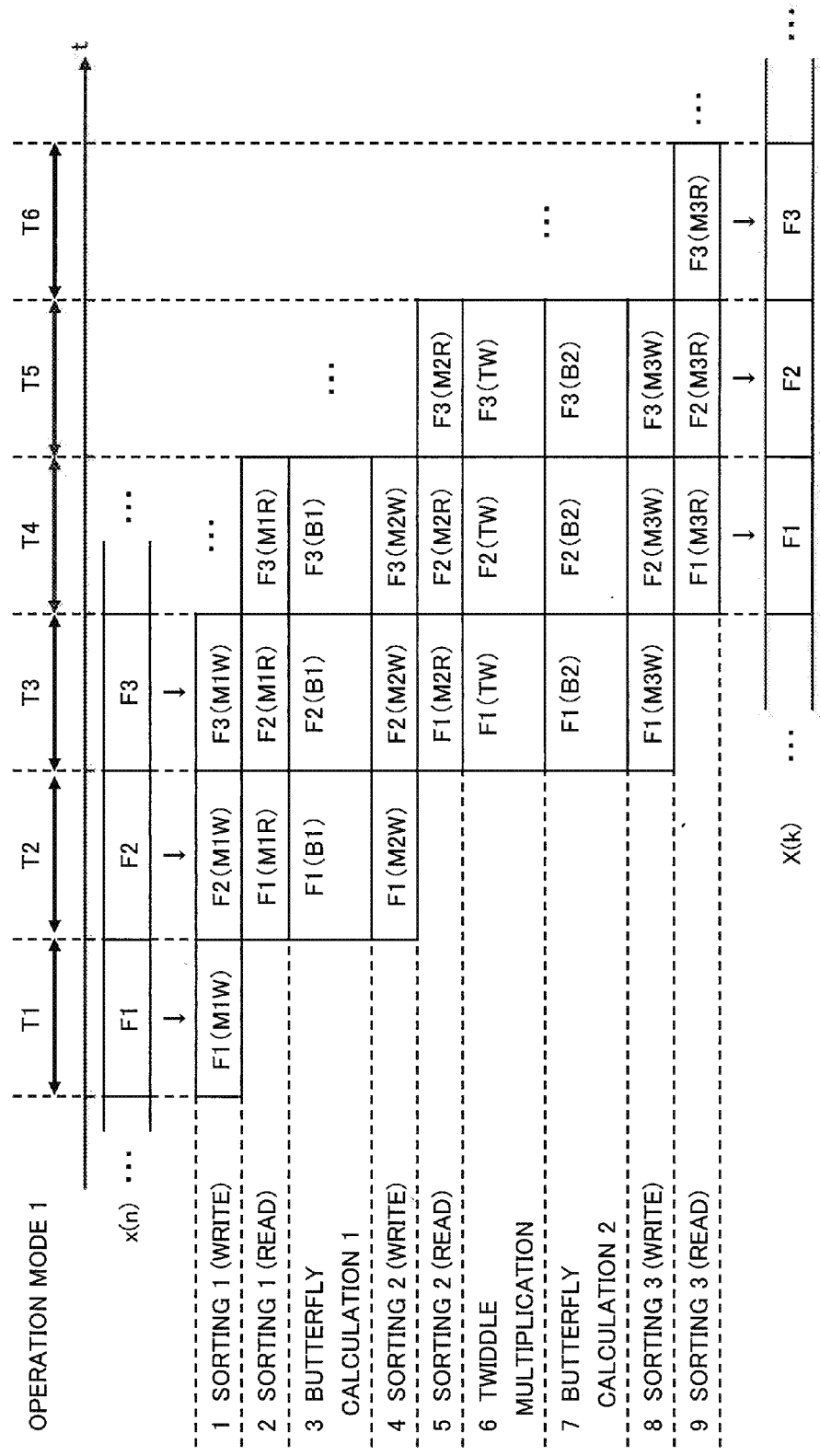
FIG. 3 is a timing diagram illustrating operations of an FFT circuit according to an exemplary embodiment of the present invention.

FIG. 3 is a timing diagram showing operations of the FFT circuit 10 in the operation mode 1. Like FIG. 11, FIG. 3 illustrates processes carried out during times T1 to T6 on FFT blocks F1, F2, and F3, where an FFT block is a unit of the FFT processing. The FFT blocks F1 to F3 are equivalent to data blocks produced by dividing the inputted time-domain signal x(n) into blocks each having an FFT block size.

FIG. 3 shows the FFT processing divided into internal processes 1 to 9. The following describes the internal processes 1 to 9 in the operation mode 1.

(1) The sorting 1 (write) is the writing processing of data into the first data-sorting processing circuit 11.

(2) The sorting 1 (read) is the reading processing of the data rearranged by the first data-sorting processing circuit 11.

(3) The butterfly calculation 1 is the first butterfly calculation performed by the first butterfly calculation processing circuit 12.

(4) The sorting 2 (write) is the writing processing of data into the second data-sorting processing circuit 13.

(5) The sorting 2 (read) is the reading processing of the data rearranged by the second data-sorting processing circuit 13.

(6) The twiddle multiplication is the twiddle multiplication processing performed by the twiddle multiplication processing circuit 14.

(7) The butterfly calculation 2 is the second butterfly calculation performed by the second butterfly calculation processing circuit 15.

(8) The sorting 3 (write) is the writing processing of data into the third data-sorting processing circuit 16.

(9) The sorting 3 (read) is the reading processing of the data rearranged by the third data-sorting processing circuit 16.

The foregoing are descriptions about the internal processes 1 to 9 in the operation mode 1.

The processing performed in the individual processing periods in FIG. 3 is described below.

(T1)

The following descriptions are about the processing performed during the time T1 processing period.

The FFT circuit 10 inputs the input data x(n) constituting the FFT block F1 into the first data-sorting processing circuit 11. The first data-sorting processing circuit 11 performs the sorting 1 (write) on the FFT block F1 (F1 (M1W)).

(T2)

The following descriptions are about the processing performed during the time T2 processing period.

The FFT circuit 10 inputs the input data x(n) constituting the FFT block F2 into the first data-sorting processing circuit 11. The first data-sorting processing circuit 11 performs the sorting 1 (write) on the input data (F2 (M1W)).

In addition, the first data-sorting processing circuit 11 performs the sorting 1 (read) on the FFT block F1 (F1 (M1R)). The sorting 1 (read) is performed to read the data in an order different from the order used for the sorting 1 (write) to write the data, thereby rearranging a data sequence based on data dependence in the FFT processing algorithm. The first butterfly calculation processing circuit 12 performs the butterfly calculation 1 on the FFT block F1 that has undergone the sorting 1 (read) (F1 (B1)). The second data-sorting processing circuit 13 proceeds to perform the sorting 2 (write) on the FFT block F1 that has undergone the butterfly calculation 1 (F1 (M2W)).

(T3)

The following descriptions are about the processing performed during the time T3 processing period.

The FFT circuit 10 inputs the input data x(n) constituting the FFT block F3 into the first data-sorting processing circuit 11. The first data-sorting processing circuit 11 performs the sorting 1 (write) on the FFT block F3 (F3 (M1W)).

In addition, the first data-sorting processing circuit 11 performs the sorting 1 (read) on the FFT block F2 that has undergone the processing in the processing period T2 (F2 (M1R)). The first butterfly calculation processing circuit 12 performs the butterfly calculation 1 on the FFT block F2 that has undergone the sorting 1 (read) (F2 (B1)). The second data-sorting processing circuit 13 performs the sorting 2 (write) on the FFT block F2 that has undergone the butterfly calculation 1 (F2 (M2W)).

In addition, the second data-sorting processing circuit 13 performs the sorting 2 (read) on the FFT block F1 that has undergone the processing in the processing period T2 (F1 (M2R)). The twiddle multiplication processing circuit 14 performs the twiddle multiplication on the FFT block F1 that has undergone the sorting 2 (read) (F1 (TW)). The second butterfly calculation processing circuit 15 performs the butterfly calculation 2 on the FFT block F1 that has undergone the twiddle multiplication (F1 (B2)). The third data-sorting processing circuit 16 performs the sorting 3 (write) on the FFT block F1 which has undergone the butterfly calculation 2 (F1 (M3W)).

(T4)

The following descriptions are about the processing performed during the time T4 processing period.

The first data-sorting processing circuit 11 performs the sorting 1 (read) on the FFT block F3 that has undergone the processing in the processing period T3 (F3 (M1R). The first butterfly calculation processing circuit 12 performs the butterfly calculation 1 on the FFT block F3 that has undergone the sorting 1 (read) (F3 (B1)). The second data-sorting processing circuit 13 performs the sorting 2 (write) on the FFT block F3 which has undergone the butterfly calculation 1 (F3 (M2W)).

In addition, the second data-sorting processing circuit 13 performs the sorting 2 (read) on the FFT block F2 that has undergone the processing in the processing period T3 (F2 (M2R)). The twiddle multiplication processing circuit 14 performs the twiddle multiplication on the FFT block F2 that has undergone the sorting 2 (read) (F2 (TW)). The second butterfly calculation processing circuit 15 performs the butterfly calculation 2 on the FFT block F2 that has undergone the twiddle multiplication (F2 (B2)). The third data-sorting processing circuit 16 performs the sorting 3 (write) on the FFT block F2 which has undergone the butterfly calculation 2 (F2 (M3W)).

In addition, the third data-sorting processing circuit 16 performs the sorting 3 (read) on the FFT block F1 that has undergone the processing in the processing period T3 (F1 (M3R)). When the FFT processing on the FFT block F1 is finished, the FFT circuit 10 outputs the resulting data as frequency-domain data X(k) (F1).

(T5)

The following descriptions are about the processing performed during the time T5 processing period.

The FFT circuit 10 performs the sorting 2 (read) on the FFT block F3 that has undergone the processing in the processing period T4 (F3 (M2R)). The twiddle multiplication processing circuit 14 performs the twiddle multiplication on the FFT block F3 that has undergone the sorting 2 (read) (F3 (TW)). The second butterfly calculation processing circuit 15 performs the butterfly calculation 2 on the FFT block F3 that has undergone the twiddle multiplication (F3 (B2)). The third data-sorting processing circuit 16 proceeds to perform the sorting 3 (write) on the FFT block F2 that has undergone the butterfly calculation 2 (F3 (M3W)).

In addition, the third data-sorting processing circuit 16 performs the sorting 3 (read) on the FFT block F2 that has undergone the processing in the processing period T4 (F2 (M3R)). When the FFT processing on the FFT block F2 is finished, the FFT circuit 10 outputs the resulting data as frequency-domain data X(k) (F2).
(T6)

The following descriptions are about the processing performed during the time T6 processing period.

The third data-sorting processing circuit 16 performs the sorting 3 (read) on the FFT block F3 that has undergone the processing in the processing period T3 (F3 (M3R)). When the FFT processing on the FFT block F3 is finished, the FFT processing circuit 10 outputs the resulting data as frequency-domain data X(k) (F3).

The above descriptions are about the processing on the FFT blocks F1 to F3. The same descriptions apply to the FFT blocks subsequent to F3 as well.

The number of operation modes is not limited to two; that is, the configuration may have three or more butterfly calculation circuits to perform butterfly calculations with calculation bit-widths which correspond to the respective butterfly circuits. In that case, it is desirable to select an operation mode which is associated with a plurality of butterfly calculations.

As described above, in the operation mode 1, the FFT circuit 10 performs butterfly calculations in a pipelined manner using both of the first and second butterfly calculation processing circuits 12 and 15. As a result, the FFT circuit 10 can achieve higher throughput performance required in the operation mode 1.

The first butterfly calculation processing circuit 12 is implemented by a circuit having a calculation bit-width (S bits) which is necessary and sufficient for achieving calculation accuracy required in the operation mode 1. In addition, the second butterfly calculation processing circuit 15 is implemented by a circuit having a wider calculation bit-width (L bits). As a result, the FFT circuit 10 can achieve the calculation accuracy required in the operation mode 1.

(Operation Mode 2)

Figure 4:
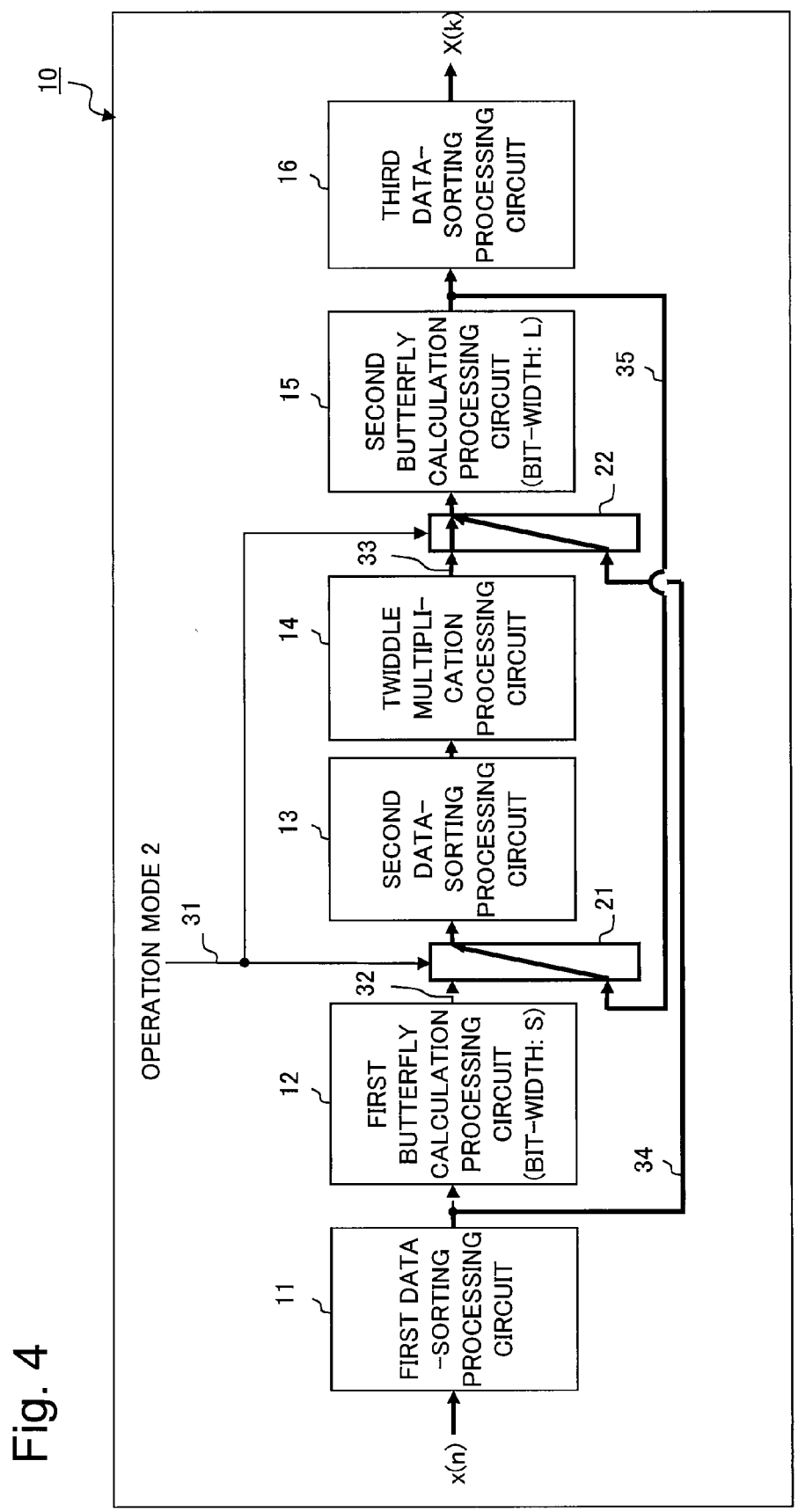
FIG. 4 is a block diagram illustrating operations of an FFT circuit according to an exemplary embodiment of the present invention.

Operations of the FFT circuit 10 in the operation mode 2 will now be described. FIG. 4 is a block diagram illustrating operations of the FFT circuit 10 in the operation mode 2. In FIG. 4, the operation set signal 31 is set to a value indicating the operation mode 2, and thus the FFT circuit 10 is operating in the operation mode 2. In FIG. 4, among circuits and data signals constituting the FFT circuit 10, the circuits and data signals actually being active in the operation mode 2 are indicated in solid lines, while the inactive circuits and data signals are indicated in dotted lines.

In the operation mode 2, the first data selection circuit 21 always selects the inputted fourth data signal 35 and outputs it to the second data-sorting processing circuit 13. That is, the other input, namely the first data signal 32, is not used.

The second data selection circuit 22 selects either the inputted second data signal 33 or the inputted third data signal 34 as appropriate depending on the specific processing in the second butterfly calculation processing circuit 15, and then outputs the selected signal to the second butterfly calculation processing circuit 15.

Figure 5:
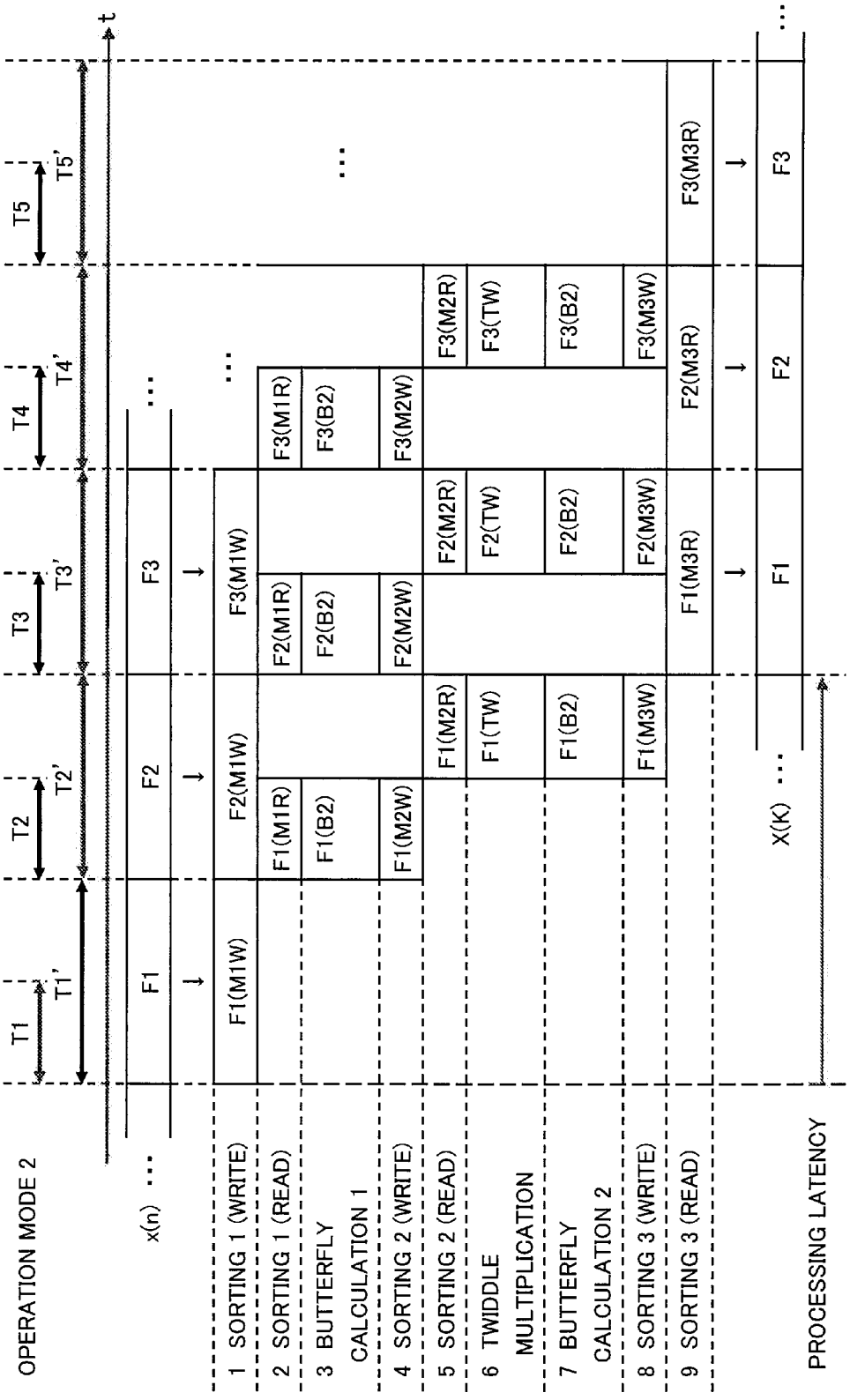
FIG. 5 is a timing diagram illustrating operations of an FFT circuit according to an exemplary embodiment of the present invention.

Example operations of the FFT circuit 10 in the operation mode 2 will now be described with reference to FIG. 5. FIG. 5 is a timing diagram showing operations of the FFT circuit 10 in the operation mode 2. FIG. 5 illustrates processes carried out during times T1' to T5' on FFT blocks F1, F2, and F3, where an FFT block is a unit of the FFT processing. The FFT blocks F1 to F3 are equivalent to data blocks produced by dividing the inputted time-domain signal x(n) into blocks each having an FFT block size.

It is assumed that, in the operation mode 2, the input throughput, namely the input speed of data x(n), is half the input throughput in the operation mode 1.

For example, the symbol rate for the 16 QAM scheme supported in the operation mode 2 may be half the symbol rate for the QPSK scheme supported in the operation mode 1. Accordingly, the input throughput should also be half. Thus, the processing throughput of the FFT circuit 10 in the operation mode 2 is half the throughput of the FFT circuit 10 in the operation mode 1. Consequently, each of the times T1' to T5' in the operation mode 2 as shown in FIG. 5 is twice as long as each of the times T1 to T5 in the operation mode 1 as shown in FIG. 3.

(Internal Processes in Operation Mode 2)

FIG. 5 shows the FFT processing divided into internal processes 1 to 9. The following describes the internal processes 1 to 9 in the operation mode 2.

(1) The sorting 1 (write) is the writing processing of data into the first data-sorting processing circuit 11.

(2) The sorting 1 (read) is the reading processing of the data rearranged by the first data-sorting processing circuit 11.

(3) The butterfly calculation 1 is the first butterfly calculation performed by the second butterfly calculation processing circuit 15.

(4) The sorting 2 (write) is the writing processing of data into the second data-sorting processing circuit 13.

(5) The sorting 2 (read) is the reading processing of the data rearranged by the second data-sorting processing circuit 13.

(6) The twiddle multiplication is the twiddle multiplication processing performed by the twiddle multiplication processing circuit 14.

(7) The butterfly calculation 2 is the second butterfly calculation performed by the second butterfly calculation processing circuit 15.

(8) The sorting 3 (write) is the writing processing of data into the third data-sorting processing circuit 16.

(9) The sorting 3 (read) is the reading processing of the data rearranged by the third data-sorting processing circuit 16.

The foregoing are descriptions about the internal processes in the operation mode 2.

In other words, the first butterfly calculation processing circuit 12 is not used in the operation mode 2. Instead the second butterfly calculation processing circuit 15 is used twice to handle both of the butterfly calculations 1 and 2.

The Processing performed in the individual processing periods in FIG. 5 in the operation mode 2 is described below.
(T1')

The following descriptions are about the processing performed during the time T1' processing period.

The FFT circuit 10 inputs the input data x(n) constituting the FFT block F1 into the first data-sorting processing circuit 11. The first data-sorting processing circuit 11 performs the sorting 1 (write) on the FFT block F1 (F1 (M1W)).
(T2')

The following descriptions are about the processing performed during the time T2' processing period.

The FFT circuit 10 inputs the input data x(n) constituting the FFT block F2 into the first data-sorting processing circuit 11. The first data-sorting processing circuit 11 performs the sorting 1 (write) on the FFT block F2 (F2 (M1W)).

In addition, the first data-sorting processing circuit 11 performs the sorting 1 (read) processing on the FFT block F1 that has undergone the processing in the T1' processing period (F1 (M1R)). The sorting 1 (read) is performed at the same speed as in the operation mode 1, and thus finished in half the T2' processing time, namely "the first half of the T2' processing period", which is equivalent to the T2 processing time in the operation mode 1.

The processed data outputted from the data-sorting processing circuit 11 is inputted to the selection circuit 22 through the third data signal 34. The selection circuit 22 selects the inputted third data signal 34 and outputs it to the second butterfly calculation processing circuit 15.

The second butterfly calculation processing circuit 15 performs the butterfly calculation 1 on the inputted data (F1 (B2)). Next, the second data-sorting processing circuit 13 performs the sorting 2 (write) on the FFT block F1 which has undergone the butterfly calculation 1 (F1 (M2W)).

The respective processes (F1 (M1R), F1 (B2), and F1 (M2W)) are carried out at the same speed as in the operation mode 1, and thus finished in half the T2' processing time, namely "the first half of the T2' processing period", which is equivalent to the T2 processing time in the operation mode 1.

Next, during the latter half of the T2' processing period, the second data-sorting processing circuit 13 performs the sorting 2 (read) on the FFT block F1 that has undergone the processing in the first half of the time T2' processing period (F1 (M2R)). The twiddle multiplication processing circuit 14 performs the twiddle multiplication on the FFT block F1 that has undergone the sorting 2 (read) (F1 (TW)).

The selection circuit 22 selects the inputted second data signal 33 and outputs it to the second butterfly calculation processing circuit 15.

The second butterfly calculation processing circuit 15 performs the butterfly calculation 2 on the inputted FFT block F1 (F1 (B2)). Next, the third data-sorting processing circuit 16 performs the sorting 3 (write) on the FFT block F2 which has undergone the butterfly calculation 2 (F1 (M3W)).

The respective processes (F1 (M2R), F1 (TW), F1 (B2), and F1 (M3W)) are also carried out at the same speed as in the operation mode 1, and thus finished in half the T2' processing time, namely "the latter half of the T2' processing period", which is equivalent to the T2 processing time in the operation mode 1.

(T3')

The following descriptions are about the processing performed during the time T3' processing period.

The FFT circuit 10 inputs the input data x(n) constituting the FFT block F3 into the first data-sorting processing circuit 11. The first data-sorting processing circuit 11 performs the sorting 1 (write) on the FFT block F3 (F3 (M1W)).

In addition, the third data-sorting processing circuit 16 performs the sorting 3 (read) on the FFT block F1 that has undergone the processing in the T2' processing period (F1 (M3R)). When the FFT processing on the FFT block F1 is finished, the third data-sorting processing circuit 16 outputs the resulting data as frequency-domain data X(k) (F1).

In addition, during the first half of the time T3' processing period, the first data-sorting processing circuit 11 performs the sorting 1 (read) on the FFT block F2 that has undergone the processing in the T2' processing period (F2 (M1R)).

The processed data outputted from the first data-sorting processing circuit 11 is inputted to the selection circuit 22 through the third data signal 34. The selection circuit 22 selects the inputted third data signal 34 and outputs it to the second butterfly calculation processing circuit 15.

The second butterfly calculation processing circuit 15 performs the butterfly calculation 1 on the inputted data (F2 (B2)). Next, the second data-sorting processing circuit 13 performs the sorting 2 (write) on the FFT block F2 which has undergone the butterfly calculation 1 (F2 (M2W)).

As seen above, the processes F2 (M1R), F2 (B2), and F2 (M2W) are carried out on the FFT block F2 during the first half of the time T3' processing period.

Next, during the latter half of the T3' processing period, the second data-sorting processing circuit 13 performs the sorting 2 (read) on the FFT block F2 that has undergone the processing in the first half of the time T3' processing period (F2 (M2R)). The twiddle multiplication processing circuit 14 performs the twiddle multiplication on the FFT block F2 that has undergone the sorting 2 (read) (F2 (TW)).

The FFT block F2 that has undergone the twiddle multiplication and is outputted from the twiddle multiplication processing circuit 14 is inputted to the selection circuit 22 through the second data signal 33. The selection circuit 22 selects the inputted second data signal 33 and outputs it to the second butterfly calculation processing circuit 15.

The second butterfly calculation processing circuit 15 performs the butterfly calculation 2 on the inputted data (F2 (B2)). Next, the third data-sorting processing circuit 16 performs the sorting 3 (write) on the FFT block F2 that has undergone the butterfly calculation 2 (F2 (M3W)).

As seen above, the processes F2 (M2R), F2 (TW), F2 (B2), and F2 (M3W) are carried out on the FFT block F2 during the latter half of the T3' processing period.

(T4')

The following descriptions are about the processing performed during the time T4' processing period.

The third data-sorting processing circuit 16 performs the sorting 3 (read) on the FFT block F2 that has undergone the processing in the time T3' processing period (F2 (M3R)). When the FFT processing on the FFT block F2 is finished, the third data-sorting processing circuit 16 outputs the resulting data as frequency-domain data X(k) (F2).

In addition, during the first half of the time T4' processing period, the first data-sorting processing circuit 11 performs the sorting 1 (read) on the FFT block F3 that has undergone the processing in the time T3' processing period (F3 (M1R)).

The processed data outputted from the first data-sorting processing circuit 11 is inputted to the selection circuit 22 through the third data signal 34. The selection circuit 22 selects the inputted third data signal 34 and outputs it to the second butterfly calculation processing circuit 15.

The second butterfly calculation processing circuit 15 performs the butterfly calculation 1 on the inputted data (F3 (B2)). Next, the second data-sorting processing circuit 13 performs the sorting 2 (write) on the FFT block F3 that has undergone the butterfly calculation 1 (F3 (M2W)).

As seen above, the processes F3 (M1R), F3 (B2), and F3 (M2W) are carried out on the FFT block F3 during the first half of the time T4' processing period.

Next, during the latter half of the time T4' processing period, the second data-sorting processing circuit 13 performs the sorting 2 (read) on the FFT block F3 that has undergone the processing in the first half of the time T4' processing period (F3 (M2R)). The twiddle multiplication processing circuit 14 performs the twiddle multiplication on the FFT block F3 that has undergone the sorting 2 (read) (F3 (TW)).

The FFT block F3 that has undergone the twiddle multiplication and is outputted from the twiddle multiplication processing circuit 14 is inputted to the selection circuit 22 through the second data signal 33. The selection circuit 22 selects the inputted second data signal 33 and outputs it to the second butterfly calculation processing circuit 15.

The second butterfly calculation processing circuit 15 performs the butterfly calculation 2 on the inputted data (F3 (B2)). Next, the third data-sorting processing circuit 16 performs the sorting 3 (write) on the FFT block F3 that has undergone the butterfly calculation 2 (F3 (M3W)).

As seen above, the processes F3 (M2R), F3 (TW), F3 (B2), and F3 (M3W) are carried out on the FFT block F3 during the latter half of the time T4' processing period. (T5')

The following descriptions are about the processing performed during the time T5' processing period.

The third data-sorting processing circuit 16 performs the sorting 3 (read) on the FFT block F3 (F3 (M3R)). When the FFT processing on the FFT block F3 is finished, the FFT circuit 10 outputs the resulting data as frequency-domain data X(k) (F3).

The above descriptions are about the processing on the FFT blocks F1 to F3, but they also apply to the FFT blocks subsequent to F3.

As described above, the FFT circuit 10 can perform the butterfly calculations 1 and 2 by using the second butterfly calculation processing circuit 15 only.

The operation mode 2 requires half the processing throughput of the operation mode 1. The operation mode 2 can achieve the FFT processing with desired high calculation accuracy by only using the second butterfly calculation processing circuit 15 having a larger calculation bit-width without the first butterfly calculation processing circuit 12 having a smaller calculation bit-width.

The present exemplary embodiment assumes that the first butterfly calculation processing circuit 12 has a small calculation bit-width and the second butterfly calculation processing circuit 15 has a large calculation bit-width, and that the operation mode 2 only uses, for butterfly calculations, the second butterfly calculation processing circuit 15 having the large calculation bit-width. To the contrary, the FFT circuit may alternatively be configured so that the first butterfly calculation processing circuit 12 has a large calculation bit-width and the second butterfly calculation processing circuit 15 has a small calculation bit-width, and the operation mode 2 only uses, for butterfly calculations, the first butterfly calculation processing circuit 12 having the large calculation bit-width.

Figure 6:
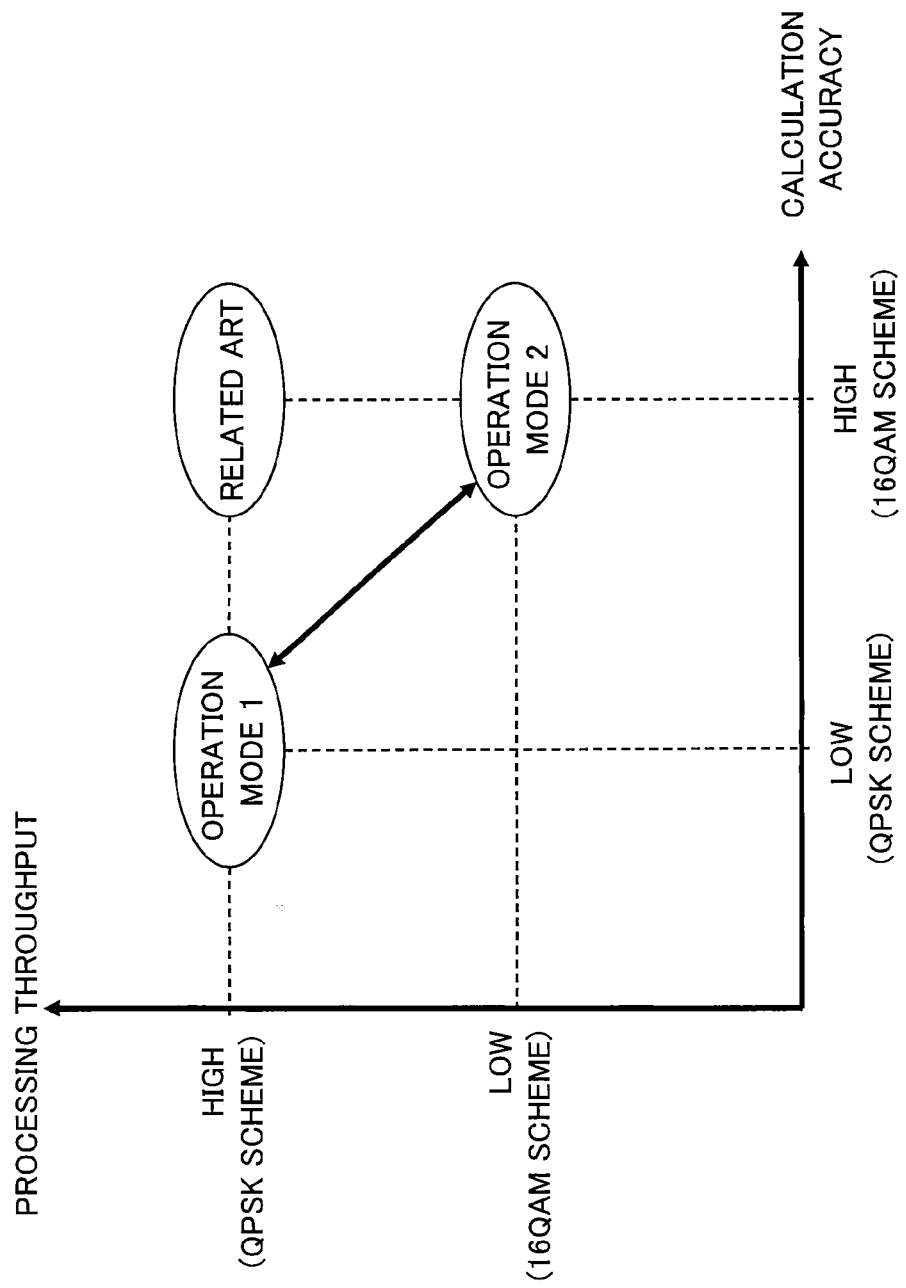
FIG. 6 is an explanatory diagram illustrating operations of an FFT circuit according to an exemplary embodiment of the present invention.

The present exemplary embodiment enables the FFT circuit 10 to switch between operation modes depending on the required processing throughput and calculation accuracy. As shown in FIG. 6, the present exemplary embodiment allows for switching between operation modes in such a way that the operation mode 1 is used when lower calculation accuracy and a higher processing throughput are needed as in the QPSK scheme and that the operation mode 2 is used when higher calculation accuracy and a lower processing throughput are needed as in the 16 QAM scheme.

On the other hand, the FFT circuit 100 in FIG. 7 uses a fixed operation mode. This means, in order to handle the case where high calculation accuracy is required, both of the two butterfly calculation processing circuits included in the FFT circuit 100 need to have a calculation bit-width large enough to achieve high calculation accuracy.

In contrast, the FFT circuit 10 according to the present exemplary embodiment changes circuit configurations depending on the operation mode and controls selection of one or both of the two butterfly calculation circuits to be used for processing. Accordingly, at least one of the butterfly calculation processing circuits may have a small calculation bit-width to meet the requirement for low calculation accuracy. As a result, a circuit size and power consumption can be reduced.

A method for the FFT processing according to an exemplary embodiment of the present invention and a program related to the method also fall within the scope of the present invention. In addition, any device that includes the FFT circuit according to an exemplary embodiment of the present invention, such as a semiconductor device, computer, or communication device, as well as any system that includes such device also fall within the scope of the present invention as far as the device or system includes the FFT circuit, method, or program of the present invention. More specifically, the FFT processing according to an exemplary embodiment of the present invention may be suitable for compensation for communication waveform distortion caused in a wired or wireless transmission line, the compensation being made by means of digital signal processing.

The present invention has been described with reference to exemplary embodiments and examples, but it is not limited to these embodiments and examples. Various modification of the present invention that could be understood by those skilled in the art may be made to configurations or details of the present invention within the scope of the present invention.

The present application claims priority based on Japanese Patent Application No. 2012-257728 filed on Nov. 26, 2012, the entire disclosure of which is herein incorporated.

REFERENCE SIGNS LIST

10 FFT circuit
11 First data-sorting processing circuit
12 First butterfly calculation processing circuit
13 Second data-sorting processing circuit
14 Twiddle multiplication processing circuit
15 Second butterfly calculation processing circuit
16 Third data-sorting processing circuit
21 First data selection circuit
22 Second data selection circuit
31 Operation set signal
32 First data signal
33 Second data signal
34 Third data signal
35 Fourth data signal
80 Sequential order table
90 Bit reverse order table
100 FFT circuit
101 First data-sorting processing circuit
102 First butterfly calculation processing circuit
103 Second data-sorting processing circuit
104 Twiddle multiplication processing circuit
105 Second butterfly calculation processing circuit
106 Third data-sorting processing circuit
110a-110h Partial data-flows
111 Data sorting processing
112 Radix-8 butterfly processing
113 Twiddle multiplication processing

What is claimed is:
1. A fast Fourier transform circuit, comprising:
   a first butterfly circuit and a second butterfly circuit which perform butterfly calculations corresponding to calculation bit-widths being different from each other; and
   a control unit which controls selection of the first and second butterfly circuits in accordance with any one of a plurality of operation modes including:
      a first operation mode in which a calculation is performed by both of the first and second butterfly circuits; and
      a second operation mode in which a calculation is performed by the second butterfly circuit.

2. The fast Fourier transform circuit according to claim 1, wherein the control unit comprises:

a first selection circuit which selects and outputs either one of data produced through a calculation performed by the first butterfly circuit and data produced through a calculation performed by the second butterfly circuit based on an operation set signal transmitted from an upper-level device: and a second selection circuit which selects and outputs either one of data which is not calculated yet by the first butterfly circuit and data which underwent selection processing performed by the first selection circuit based on the operation set signal transmitted from the upper-level device.

3. The fast Fourier transform circuit according to claim 2, wherein, in the first operation mode, the first selection circuit selects and outputs data produced through a calculation performed by the first butterfly circuit, and the second selection circuit selects and outputs data which underwent a calculation performed by the first butterfly circuit, and wherein, in the second operation mode, the first selection circuit selects and outputs data produced through a calculation performed by the second butterfly circuit, and the second selection circuit either selects and outputs data which is not calculated yet by the first butterfly circuit if the second butterfly circuit is to perform the first butterfly calculation or selects and outputs data which underwent data selection made by the first selection circuit if the second butterfly circuit is to perform the second butterfly calculation.

4. The fast Fourier transform circuit according to claim 1, wherein, in signal processing involving different modulation schemes, the first butterfly circuit performs a first butterfly calculation which corresponds to a first calculation bit-width, and the second butterfly circuit performs, in conjunction with the first butterfly calculation, a second butterfly calculation which corresponds to a second calculation bit-width that is larger than the first calculation bit-width.

5. The fast Fourier transform circuit according to claim 4, wherein, in the first operation mode, the first butterfly circuit performs the first butterfly calculation and the second butterfly circuit performs the second butterfly calculation, and wherein, in the second operation mode, the second butterfly circuit performs at least one of the first and second butterfly calculations.

6. The fast Fourier transform circuit according to claim 4, comprising:

a twiddle multiplication circuit between the first butterfly circuit and the second butterfly circuit, the twiddle multiplication circuit handling rotation of a complex number on a complex plane in fast Fourier transform processing.

7. The fast Fourier transform circuit according to claim 6, comprising:

a first sorting circuit which rearranges inputted time-domain data based on data dependence in a Fourier transform processing algorithm and outputs the rearranged data to the first butterfly circuit;

a second sorting circuit which rearranges inputted data from either one of the first and second butterfly circuits based on data dependence in a Fourier transform processing algorithm and outputs the rearranged data to the twiddle multiplication circuit:

a third sorting circuit which rearranges data inputted from the second butterfly circuit based on data dependence in a fast Fourier transform processing algorithm and outputs a frequency-domain signal.

8. A fast Fourier transform circuit which performs a Fourier transform to convert time-domain data into a frequency-domain signal, the fast Fourier transform circuit comprising:

a first sorting circuit which rearranges the inputted time-domain data based on data dependence in a Fourier transform processing algorithm;

a first butterfly circuit which performs a first butterfly calculation on data inputted from the first sorting circuit;

a second sorting circuit which rearranges inputted data based on data dependence in a Fourier transform processing algorithm;

a twiddle multiplication circuit which handles rotation of a complex number on a complex plane on data inputted from the second sorting circuit;

a second butterfly circuit which performs a second butterfly calculation on an inputted signal, the second butterfly calculation corresponding to a calculation bit-width being different from that for the first butterfly calculation;

a third sorting circuit which rearranges data inputted from the second butterfly circuit based on data dependence in a fast Fourier transform processing algorithm and outputs a frequency-domain signal;

a first selection circuit which selects either one of data inputted from the first butterfly circuit and data inputted from the second butterfly circuit and outputs the selected data to the second sorting circuit; and a second selection circuit which selects either one of data inputted from the twiddle multiplication circuit and data inputted from the first sorting circuit and outputs the selected data to the second butterfly circuit, wherein the first and second selection circuits each select a signal to be outputted based on an operation set signal from an upper-level device, and control selection of the first and second butterfly circuits in accordance with any one of a plurality of operation modes including:

a first operation mode in which a calculation is performed by both of the first and second butterfly circuits; and a second operation mode in which a calculation is performed by the second butterfly circuit.

9. A method for processing a fast Fourier transform in a fast Fourier transform circuit comprising a first butterfly circuit and a second butterfly circuit which respectively perform butterfly calculations operating with calculation bit-widths being different from each other, the method comprising:

controlling selection of the first and second butterfly circuits in accordance with any one of a plurality of operation modes including:

a first operation mode in which a calculation is performed by both of the first and second butterfly circuits; and a second operation mode in which a calculation is performed by the second butterfly circuit.

* * * * *